(12) United States Patent
Raghavan et al.

(10) Patent No.: US 11,696,312 B2
(45) Date of Patent: Jul. 4, 2023

(54) FREQUENCY AND STATE DEPENDENT USER EQUIPMENT BEAM PATTERNS

(71) Applicant: QUALCOMM Incorporated, San Diego, CA (US)

(72) Inventors: Vasanthan Raghavan, West Windsor Township, NJ (US); Sony Akkarakaran, Poway, CA (US); Juergen Cezanne, Ocean Township, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 297 days.

(21) Appl. No.: 17/102,523

(22) Filed: Nov. 24, 2020

(65) Prior Publication Data

US 2022/0167342 A1 May 26, 2022

(51) Int. Cl.
*H04W 72/51* (2023.01)
*H04L 5/00* (2006.01)
(Continued)

(52) U.S. Cl.
CPC .......... *H04W 72/51* (2023.01); *H04L 5/0048* (2013.01); *H04W 64/006* (2013.01); *H04W 72/044* (2013.01)

(58) Field of Classification Search
CPC ... H04L 5/0048; H04L 5/0023; H04L 5/0053; H04L 5/0085; H04L 5/0094;
(Continued)

(56) References Cited

U.S. PATENT DOCUMENTS

2015/0236413 A1* 8/2015 Turpin ..................... H01Q 3/34
342/368
2016/0157267 A1* 6/2016 Frenne .............. H04W 74/0833
370/329
(Continued)

FOREIGN PATENT DOCUMENTS

CN 114731654 A * 7/2022 ............. H04L 5/001
WO 2014027941 A1 2/2014
(Continued)

OTHER PUBLICATIONS

International Search Report and Written Opinion—PCT/US2021/053687—ISA/EPO—dated Mar. 21, 2022.

*Primary Examiner* — Dung Hong
(74) *Attorney, Agent, or Firm* — Sunstein LLP/Qualcomm

(57) ABSTRACT

Techniques are provided for enabling user equipment (UE) positioning based on angle estimation in millimeter wave (mmW) bands. An example method for determining a location of a mobile device includes transmitting array gain information to a network entity, the array gain information including beam pattern information based at least in part on a sub-band and a state of the mobile device, receiving one or more reference signals in one or more sub-bands, wherein a receive beam for each of the one or more reference signals is based at least in part on the sub-band the one or more reference signals are being received in, and on a current state of the mobile device, determining measurement values based on the one or more reference signals, and determining the location of the mobile device based at least in part on the measurement values.

19 Claims, 20 Drawing Sheets

(51) Int. Cl.
*H04W 64/00* (2009.01)
*H04W 72/044* (2023.01)

(58) Field of Classification Search
CPC .. H04B 7/0695; H04B 7/0617; H04B 7/0632; H04B 7/0626; H04B 17/318; H04W 52/0216; H04W 72/1268; H04W 72/0453; H04W 72/51; H04W 64/006; H04W 72/044
See application file for complete search history.

(56) References Cited

U.S. PATENT DOCUMENTS

| | | | |
|---|---|---|---|
| 2018/0069613 A1* | 3/2018 | Li | H04B 7/0632 |
| 2018/0324713 A1* | 11/2018 | Yoo | H04W 52/40 |
| 2019/0166568 A1* | 5/2019 | Tang | H04W 72/0453 |
| 2019/0260485 A1* | 8/2019 | Byun | H04B 17/336 |
| 2020/0145977 A1* | 5/2020 | Kumar | H04L 5/0048 |
| 2020/0351798 A1* | 11/2020 | Ji | H04W 52/10 |
| 2020/0396035 A1* | 12/2020 | Yu | H04L 5/006 |
| 2021/0058999 A1* | 2/2021 | Chen | H04W 72/23 |
| 2022/0053351 A1* | 2/2022 | Chen | H04B 7/063 |

FOREIGN PATENT DOCUMENTS

| | | | | |
|---|---|---|---|---|
| WO | WO-2014027941 A1 * | 2/2014 | | G01S 5/0205 |
| WO | 2020068331 A1 | 4/2020 | | |
| WO | 2020111986 A1 | 6/2020 | | |

* cited by examiner

US 11,696,312 B2

FREQUENCY AND STATE DEPENDENT USER EQUIPMENT BEAM PATTERNS

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service, a fourth-generation (4G) service (e.g., Long Term Evolution (LTE) or WiMax), and a fifth generation (5G) service (e.g., 5G New Radio (NR)). There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, etc.

It is often desirable to know the location of a user equipment (UE), e.g., a cellular phone, with the terms "location" and "position" being synonymous and used interchangeably herein. A location services client (LSC) may desire to know the location of the UE and may communicate with a location center in order to request the location of the UE. The location center and the UE may exchange messages, as appropriate, to obtain a location estimate for the UE. The location center may return the location estimate to the LSC, e.g., for use in one or more applications.

Obtaining the location of a mobile device that is accessing a wireless network may be useful for many applications including, for example, emergency calls, personal navigation, asset tracking, locating a friend or family member, etc. Existing positioning methods include methods based on measuring radio signals transmitted from a variety of devices including satellite vehicles and terrestrial radio sources in a wireless network such as base stations and access points. Stations in a wireless network may be configured to transmit reference signals to enable mobile device to perform positioning measurements. The antenna arrays in mobile devices used in high frequency wireless networks may be required to cover a wide bandwidth in combination with various system states. The fixed element spacing in antenna arrays on a mobile device may reduce the array gain in portions of the bandwidth and degrade the accuracy of reference signals and corresponding positioning measurements. Further, the mobile device may be configured for different states such as when disposed in a cradle, being held by a user, being held to an ear, being attached to a peripheral device, etc. The various states of the mobile device may also reduce the gain of signals transmitted or received by the mobile device.

SUMMARY

An example method for determining a location of a mobile device according to the disclosure includes transmitting array gain information to a network entity, the array gain information including beam pattern information based at least in part on a sub-band and a state of the mobile device, receiving one or more reference signals in one or more sub-bands, wherein a receive beam for each of the one or more reference signals is based at least in part on the sub-band the one or more reference signals are being received in, and on a current state of the mobile device, determining measurement values based on the one or more reference signals, and determining the location of the mobile device based at least in part on the measurement values.

Implementations of such as method may include one or more or the following features. Determining the location of the mobile device may include providing, with the mobile device, the measurement values based on the one or more reference signals including receive beam identifications associated with each of the respective receive beams used to receive the one or more reference signals to the network entity. The state of the mobile device may be based at least in part on a peripheral device that is operably coupled to the mobile device. The peripheral device may be at least one of a headphone, a power cord, a card reader, or a mobile device cover. The state of the mobile device may be based at least in part on a proximity of a user to the mobile device. The sub-band may be based on an active bandwidth part utilized by the mobile device. The sub-band may be based on a resource bandwidth. The array gain information may include beam pattern information based on a plurality of antenna elements from a plurality of antenna modules. The beam pattern information may include gain and direction information of at least one of a main lobe, side lobes, beam nulls, and grating lobes. The measurement values may include one or more of an Angle of Arrival (AoA), a Received Signal Strength Indicator (RSSI), Round Trip signal propagation Time (RTT), Reference Signal Time Difference (RSTD), Reference Signal Received Power (RSRP), and Reference Signal Received Quality (RSRQ).

An example method for measuring uplink reference signals according to the disclosure includes receiving, from a mobile device, array gain information including beam pattern information based at least in part on a sub-band and a state of the mobile device, providing an indication of one or more uplink reference signals to be transmitted by the mobile device based at least in part on the array gain information, and measuring an uplink reference signal transmitted by the mobile device in the sub-band.

Implementations of such as method may include one or more of the following features. A measurement value for the uplink reference signal may be provided to a network entity. The state of the mobile device may be based at least in part on a peripheral device that is operably coupled to the mobile device. The peripheral device may be at least one of a headphone, a power cord, a card reader, or a mobile device cover. The state of the mobile device may be based at least in part on a proximity of the mobile device to a user. The sub-band may be based on an active bandwidth part utilized by the mobile device. The sub-band may be based on a resource bandwidth. The array gain information may include beam pattern information based on a plurality of antenna modules. The beam pattern information may include gain and direction information of at least one of a main lobe, side lobes, beam nulls, and grating lobes. Measuring the uplink reference signal may include obtaining one or more of a Received Signal Strength Indicator (RSSI), Round Trip signal propagation Time (RTT), Reference Signal Time Difference (RSTD), Reference Signal Received Power (RSRP), and Reference Signal Received Quality (RSRQ).

An example apparatus according to the disclosure includes a memory, at least one transceiver, at least one processor communicatively coupled to the memory and the at least one transceiver, and configured to transmit, with the at least one transceiver, array gain information to a network entity, the array gain information including beam pattern information based at least in part on a sub-band and a state of the apparatus, receive, with the at least one transceiver, one or more reference signals in one or more sub-bands, wherein a receive beam for each of the one or more reference signals is based at least in part on the sub-band the one or more reference signals are being received in, and on a current state of the apparatus, determine measurement values based on the one or more reference signals, and determine a location based at least in part on the measurement values.

Implementations of such an apparatus may include one or more of the following features. The at least one processor may be further configured to provide the measurement values based on the one or more reference signals including receive beam identifications associated with each of the respective receive beams used to receive the one or more reference signals to the network entity. The state of the apparatus may be based at least in part on a peripheral device that is operably coupled to the apparatus. The peripheral device may be at least one of a headphone, a power cord, a card reader, or a mobile device cover. The state of the apparatus may be based at least in part on a proximity of a user to the apparatus. The sub-band may be based on an active bandwidth part utilized by the apparatus. The sub-band may be based on a resource bandwidth. The array gain information may include beam pattern information based on a plurality of antenna elements from a plurality of antenna modules. The beam pattern information may include gain and direction information of at least one of a main lobe, side lobes, beam nulls, and grating lobes. The measurement values may include one or more of an Angle of Arrival (AoA), a Received Signal Strength Indicator (RSSI), Round Trip signal propagation Time (RTT), Reference Signal Time Difference (RSTD), Reference Signal Received Power (RSRP), and Reference Signal Received Quality (RSRQ).

An example apparatus according to the disclosure includes a memory, at least one transceiver, at least one processor communicatively coupled to the memory and the at least one transceiver, and configured to receive, from a mobile device with the at least one transceiver, array gain information including beam pattern information based at least in part on a sub-band and a state of the mobile device, provide an indication of one or more uplink reference signals to be transmitted by the mobile device based at least in part on the array gain information, and measure an uplink reference signal transmitted by the mobile device in the sub-band.

Implementations of such an apparatus may include one or more of the following features. The at least one processor may be further configured to provide a measurement value for the uplink reference signal to a network entity. The state of the mobile device may be based at least in part on a peripheral device that is operably coupled to the mobile device. The peripheral device may be at least one of a headphone, a power cord, a card reader, or a mobile device cover. The mobile device may be based at least in part on a proximity of the mobile device to a user. The sub-band may be based on an active bandwidth part utilized by the mobile device. The sub-band may be based on a resource bandwidth. The array gain information may includes beam pattern information based on a plurality of antenna modules. The beam pattern information may include gain and direction information of at least one of a main lobe, side lobes, beam nulls, and grating lobes. Measuring the uplink reference signal may include obtaining one or more of a Received Signal Strength Indicator (RSSI), Round Trip signal propagation Time (RTT), Reference Signal Time Difference (RSTD), Reference Signal Received Power (RSRP), and Reference Signal Received Quality (RSRQ).

An example apparatus for determining a location of a mobile device according to the disclosure includes means for transmitting array gain information to a network entity, the array gain information including beam pattern information based at least in part on a sub-band and a state of the mobile device, means for receiving one or more reference signals in one or more sub-bands, wherein a receive beam for each of the one or more reference signals is based at least in part on the sub-band the one or more reference signals are being received in, and on a current state of the mobile device, means for determining measurement values based on the one or more reference signals, and means for determining the location of the mobile device based at least in part on the measurement values.

An example apparatus for measuring uplink reference signals according to the disclosure includes means for receiving, from a mobile device, array gain information including beam pattern information based at least in part on a sub-band and a state of the mobile device, means for providing an indication of one or more uplink reference signals to be transmitted by the mobile device based at least in part on the array gain information, and means for measuring an uplink reference signal transmitted by the mobile device in the sub-band.

An example non-transitory processor-readable storage medium comprising processor-readable instructions configured to cause one or more processors to determine a location of a mobile device according to the disclosure includes code for transmitting array gain information to a network entity, the array gain information including beam pattern information based at least in part on a sub-band and a state of the mobile device, code for receiving one or more reference signals in one or more sub-bands, wherein a receive beam for each of the one or more reference signals is based at least in part on the sub-band the one or more reference signals are being received in, and on a current state of the mobile device, code for determining measurement values based on the one or more reference signals, and code for determining the location of the mobile device based at least in part on the measurement values.

An example non-transitory processor-readable storage medium comprising processor-readable instructions configured to cause one or more processors to measure uplink reference signals according to the disclosure includes code for receiving, from a mobile device, array gain information including beam pattern information based at least in part on a sub-band and a state of the mobile device, code for providing an indication of one or more uplink reference signals to be transmitted by the mobile device based at least in part on the array gain information, and code for measuring an uplink reference signal transmitted by the mobile device in the sub-band.

Items and/or techniques described herein may provide one or more of the following capabilities, as well as other capabilities not mentioned. A mobile device may utilize one or more antenna modules with each module having an antenna array with fixed element spacing. The fixed element spacing may cause beam squinting for some frequencies in a wide bandwidth. The transmit and receive beam patterns may also be impacted by a state of the mobile device. The beam patterns for a mobile device may be characterized based on the frequency and state of the mobile device. The frequency and state based antenna gain and beam pattern information may be provided to a network resource. The mobile device may be configured to measure downlink reference signals based on the frequency and state dependent antenna gain and beam pattern information. The mobile device may be configured to provide uplink reference signals based on the antenna gain and beam pattern information. The antenna gain and beam pattern information may be used to improve reference signal based location estimates for the mobile device. Other capabilities may be provided and not every implementation according to the disclosure must provide any, let alone all, of the capabilities discussed.

DETAILED DESCRIPTION

Figure 1:
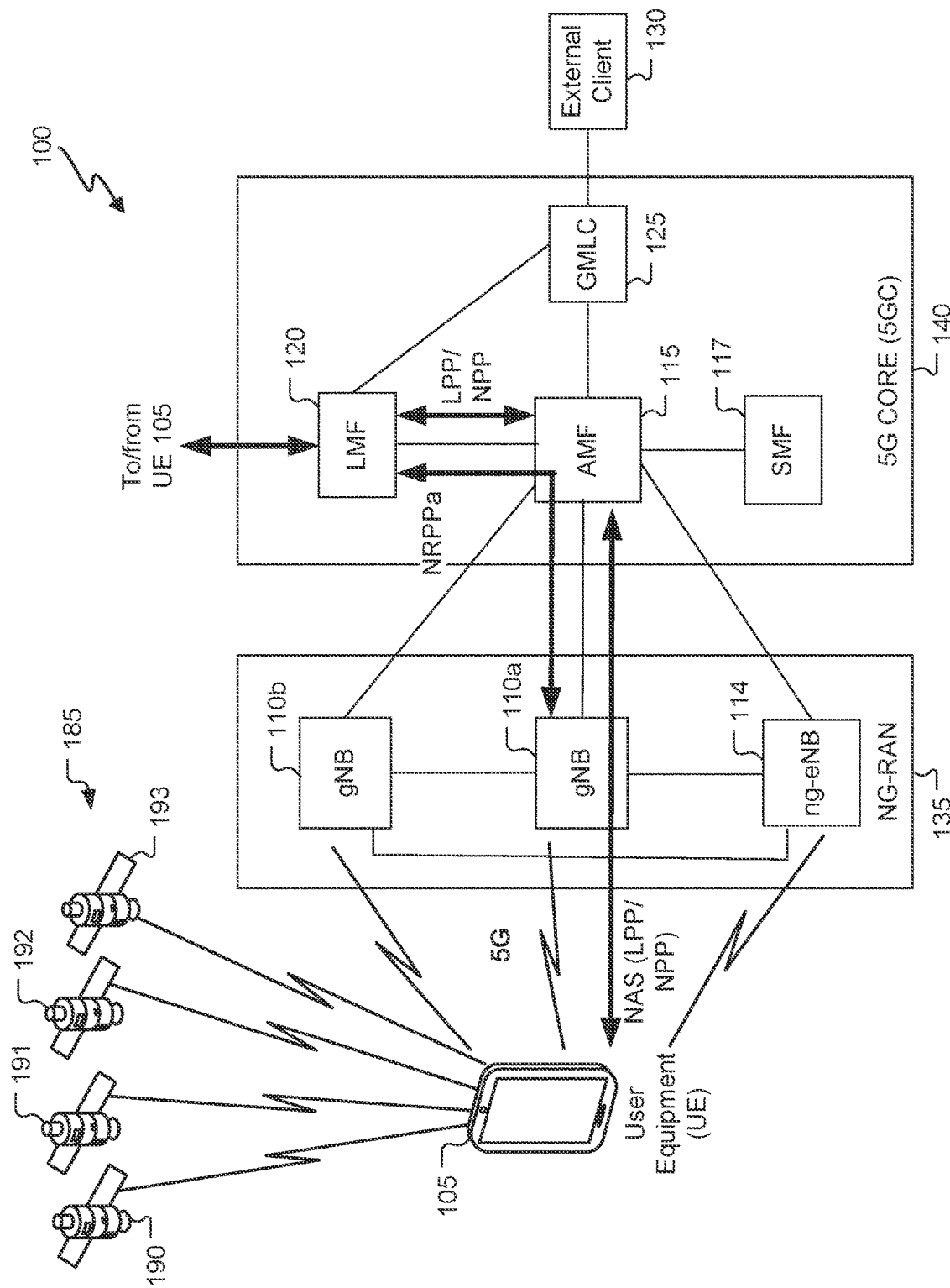
FIG. 1 is a simplified diagram of an example wireless communications system.

Techniques are discussed herein for enabling user equipment (UE) positioning based on UE side angle estimation in millimeter wave (mmW) bands (and beyond). For example, the techniques include determining and providing beam pattern assistance data as a function of frequency and UE state. In a UE-based downlink Angle of Arrival (AoA) example, assistance data including information of the beam shapes associated with different sub-bands and/or UE states may be stored on the UE, and the UE may be configured to determine a location based in part on reference signals received in current sub-band and state, and the corresponding beam shape information. In a UE-assisted AoA example, assistance data including information of the UE specific beam shapes associated with different sub-bands and/or UE states may be provided to a network resource such as a base station or network server, and the UE may report the AoA of measured reference beams on a sub-band to the network resource to determine the location of the UE. In an uplink Angle of Departure (AoD) approach, the UE may provide array gain information including beam pattern information based on frequency and the UE state. The UE may transmit uplink reference signals including a beam identification. The network may be configured to determine the location of the UE based on the uplink reference signals and the beam pattern information.

In operation, a mmW application may require ultra-wideband coverage with an antenna array with a fixed element spacing. For example, the ratio of the element spacing in the antenna array may vary from approximately one-half a wavelength corresponding to the carrier frequency to approximately one wavelength of the carrier frequency. In general, the antenna array gain distribution as a function of spatial angles (e.g., beam pattern/shape) generally drifts with frequency due to beam squinting effects associated with the fixed inter-element spacings for the ultra-wideband coverage. Positioning techniques using a fixed set of beam weights at a certain carrier frequency may generally correspond to certain AoD and AoA estimates at that frequency. The same beam weights, however may correspond to different AoD and AoA estimates at different frequencies within the ultra-wideband coverage. Further, the state of the UE may impact the array gain and the corresponding beam weights. For example, proximity sensors may limit the output of an antenna array based on the relative location of a user's hand or head. Other peripherals, such as headphones, credit card readers, device covers, power cords, etc. may impact the beam pattern/shape. Thus, the positioning of a UE based on AoD and AoA estimates may be based on the beam shapes associated with the different frequencies/sub-bands/Resource Block (RB) subsets and the current state of the UE.

In an embodiment, a UE may provide assistance data indicating frequencies, states and corresponding beam shapes used by the UE. Different Bandwidth Parts (BWPs) may have different beam shapes for different UE states. Different receive beams for DL-PRS positioning may have different beam shapes, and the frequency and state dependent beam shapes may be used for positioning based on AoA and AoD techniques. In another embodiment, a base station, or other network resource, may utilize the UE specific frequency and state dependent beam shapes for AoD based positioning techniques to determine a location of a UE based on UL signals transmitted by the UE and received by one or more base stations. The different beam shapes may be used for azimuth and/or elevation.

Referring to FIG. 1, an example of a communication system 100 includes a UE 105, a Radio Access Network (RAN) 135, here a Fifth Generation (5G) Next Generation (NG) RAN (NG-RAN), and a 5G Core Network (5GC) 140. The UE 105 may be, e.g., an IoT device, a location tracker device, a cellular telephone, or other device. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the 3$^{rd}$ Generation Partnership Project (3GPP). Accordingly, the NG-RAN 135 and the 5GC 140 may conform to current or future standards for 5G support from 3GPP. The RAN 135 may be another type of RAN, e.g., a 3G RAN, a 4G Long Term Evolution (LTE) RAN, etc. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes 5G-NR nodeBs (gNBs) 110*a*, 110*b*, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110*a*, 110*b* and the ng-eNB 114 are communicatively coupled to each other, are each configured to bi-directionally wirelessly communicate with the UE 105, and are each communicatively coupled to, and configured to bi-directionally communicate with, the AMF 115. The AMF 115, the SMF 117, the LMF 120, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions.

FIG. 1 provides a generalized illustration of various components, any or all of which may be utilized as appropriate, and each of which may be duplicated or omitted as necessary. Specifically, although only one UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110*a*, 110*b*, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110*a*, 110*b*, or the LMF 120 based on measurement quantities received at the UE 105 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs (gNodeBs) 110*a*. 110*b* are examples and may, in various embodiments, be replaced by or include various other location server functionality and/or base station functionality respectively.

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, tracking device, navigation device, Internet of Things (IoT) device, asset tracker, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95/a, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies. The UE 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi Direct (WiFi-D), Bluetooth®, and so on. One or more of a group of UEs utilizing D2D communications may be within a geographic coverage area of a Transmission/Reception Point (TRP) such as one or more of the gNBs 110*a*, 110*b*, and/or the ng-eNB 114. Other UEs in such a group may be outside such geographic coverage areas, or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110*a* and 110*b*. Pairs of the gNBs 110*a*, 110*b* in the NG-RAN 135 may be connected to one another via one or more other gNBs. Access to the 5G network is provided to the UE 105 via wireless communication between the UE 105 and one or more of the gNBs 110*a*, 110*b*, which may provide wireless communications access to the 5GC 140 on behalf of the UE 105 using 5G. In FIG. 1, the serving gNB for the UE 105 is assumed to be the gNB 110*a*, although another gNB (e.g. the gNB 110*b*) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110*a*, 110*b* in the NG-RAN 135, possibly via one or more other gNBs and/or one or more other ng-eNBs. The ng-eNB 114 may provide LTE wireless access and/or evolved LTE (eLTE) wireless access to the UE 105. One or more of the gNBs 110*a*, 110*b* and/or the ng-eNB 114 may be configured to function as positioning-only beacons which may transmit signals to assist with determining the position of the UE 105 but may not receive signals from the UE 105 or from other UEs.

The BSs 110*a*, 110*b*, 114 may each comprise one or more TRPs. For example, each sector within a cell of a BS may comprise a TRP, although multiple TRPs may share one or more components (e.g., share a processor but have separate antennas). The system 100 may include only macro TRPs or the system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110*a*, 110*b* and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may communicate directly with the UE 105, e.g., through wireless communications. The LMF 120 may support positioning of the UE 105 when the UE 105 accesses the NG-RAN 135 and may support position procedures/methods such as Assisted GNSS (A-GNSS), Observed Time Difference of Arrival (OTDOA), Real Time Kinematics (RTK), Precise Point Positioning (PPP), Differential GNSS (DGNSS), Enhanced Cell ID (E-CID), angle of arrival (AOA), angle of departure (AOD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE 105) may be performed at the UE 105 (e.g., using signal measurements obtained by the UE 105 for signals transmitted by wireless nodes such as the gNBs 110*a*, 110*b* and/or the ng-eNB 114, and/or assistance data provided to the UE 105, e.g. by the LMF 120).

The GMLC 125 may support a location request for the UE 105 received from the external client 130 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130. The GMLC 125 is shown connected to both the AMF 115 and LMF 120, though only one of these connections may be supported by the 5GC 140 in some implementations.

As further illustrated in FIG. 1, the LMF 120 may communicate with the gNBs 110*a*, 110*b* and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110*a* (or the gNB 110*b*) and the LMF 120, and/or between the ng-eNB 114 and the LMF 120, via the AMF 115. As further illustrated in FIG. 1, the LMF 120 and the UE 105 may communicate using an LTE Positioning Protocol (LPP), which may be defined in 3GPP TS 36.355. The LMF 120 and the UE 105 may also communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and the serving gNB 110*a*, 110*b* or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110*a*, 110*b* or the ng-eNB 114) and/or may be used by the LMF 120 to obtain location related information from the gNBs 110*a*, 110*b* and/or the ng-eNB 114, such as parameters defining directional SS transmissions from the gNBs 110*a*, 110*b*, and/or the ng-eNB 114.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indicator (RSSI), Round Trip signal propagation Time (RTT), Reference Signal Time Difference (RSTD), Reference Signal Received Power (RSRP) and/or Reference Signal Received Quality (RSRQ) for the gNBs 110*a*, 110*b*, the ng-eNB 114, and/or a WLAN AP. The location measurements may also include measurements of GNSS pseudorange, code phase, and/or carrier phase for the SVs 190-193.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110*a*, 110*b*, the ng-eNB 114, or other base stations or APs).

With a network-based position method, one or more base stations (e.g., the gNBs 110*a*, 110*b*, and/or the ng-eNB 114) or APs may obtain location measurements (e.g., measurements of RSSI, RTT, RSRP, RSRQ or Time Difference Of Arrival (TDOA) for signals transmitted by the UE 105) and/or may receive measurements obtained by the UE 105. The one or more base stations or APs may send the measurements to a location server (e.g., the LMF 120) for computation of a location estimate for the UE 105.

Information provided by the gNBs 110*a*, 110*b*, and/or the ng-eNB 114 to the LMF 120 using NRPPa may include timing and configuration information for directional SS transmissions and location coordinates. The LMF 120 may provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or OTDOA (or some other position method). In the case of E-CID, the LPP or NPP message may instruct the UE 105 to obtain one or more measurement quantities (e.g., beam ID, beam width, mean angle, RSRP. RSRQ measurements) of directional signals transmitted within particular cells supported by one or more of the gNBs 110*a*, 110*b*, and/or the ng-eNB 114 (or supported by some other type of base station such as an eNB or WiFi AP). The UE 105 may send the measurement quantities back to the LMF 120 in an LPP or NPP message (e.g., inside a 5G NAS message) via the serving gNB 110*a* (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 150. For example, the WLAN may support IEEE 802.11 WiFi access for the UE 105 and may comprise one or more WiFi APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UE 105. In these other embodiments, positioning of the UE 105 using directional PRSs may be supported in an analogous manner to that described herein for a 5G network with the difference that functions and procedures described herein for the gNBs 110*a*, 10*b*, the ng-eNB 114, the AMF 115, and the LMF 120 may, in some cases, apply instead to other network elements such eNBs, WiFi APs, an MME, and an E-SMLC.

As noted, in some embodiments, positioning functionality may be implemented, at least in part, using the directional SS beams, sent by base stations (such as the gNBs 110*a*, 110*b*, and/or the ng-eNB 114) that are within range of the UE whose position is to be determined (e.g., the UE 105 of FIG. 1). The UE may, in some instances, use the directional SS beams from a plurality of base stations (such as the gNBs 110*a*, 110*b*, the ng-eNB 114, etc.) to compute the UE's position.

Figure 2:
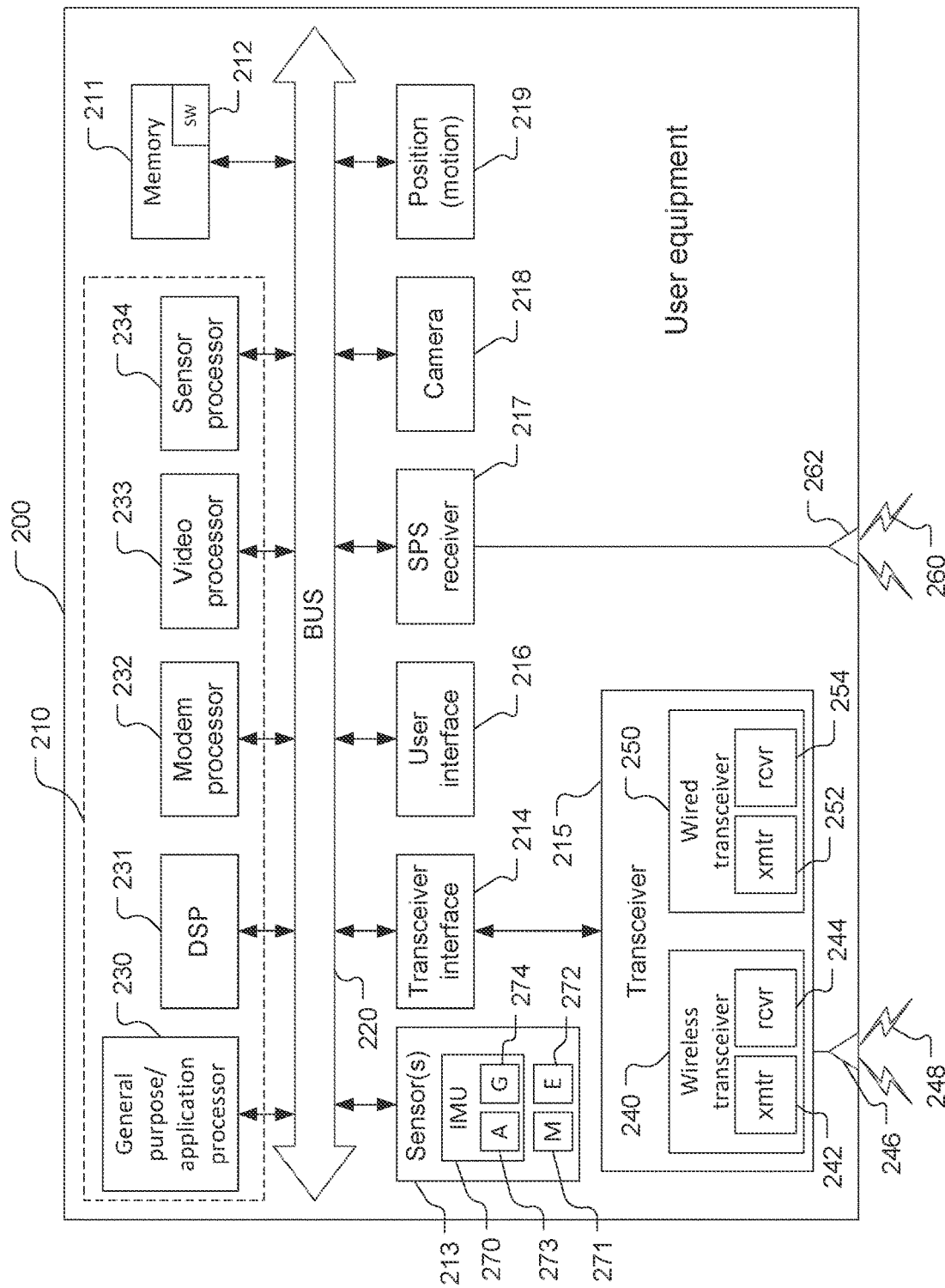
FIG. 2 is a block diagram of components of an example user equipment shown in FIG. 1.

Referring also to FIG. 2, a UE 200 is an example of the UE 105 and comprises a computing platform including a processor 210, memory 211 including software (SW) 212, one or more sensors 213, a transceiver interface 214 for a transceiver 215, a user interface 216, a Satellite Positioning System (SPS) receiver 217, a camera 218, and a position (motion) device 219. The processor 210, the memory 211, the sensor(s) 213, the transceiver interface 214, the user interface 216, the SPS receiver 217, the camera 218, and the position (motion) device 219 may be communicatively coupled to each other by a bus 220 (which may be configured, e.g., for optical and/or electrical communication). One or more of the shown apparatus (e.g., the camera 218, the position (motion) device 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for radar, ultrasound, and/or lidar, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 is a non-transitory storage medium that may include random access memory (RAM), flash memory, disc memory, and/or read-only memory (ROM), etc. The memory 211 stores the software 212 which may be processor-readable, processor-executable software code containing instructions that are configured to, when executed, cause the processor 210 to perform various functions described herein. Alternatively, the software 212 may not be directly executable by the processor 210 but may be configured to cause the processor 210. e.g., when compiled and executed, to perform the functions. The description may refer only to the processor 210 performing a function, but this includes other implementations such as where the processor 210 executes software and/or firmware. The description may refer to the processor 210 performing a function as shorthand for one or more of the processors 230-234 performing the function. The description may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the invention, including the claims, and other configurations may be used. For example, an example configuration of the UE includes one or more of the processors 230-234 of the processor 210, the memory 211, and the wireless transceiver 240. Other example configurations include one or more of the processors 230-234 of the processor 210, the memory 211, the wireless transceiver 240, and one or more of the sensor(s) 213, the user interface 216, the SPS receiver 217, the camera 218, the PMD 219, and/or the wired transceiver 250.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the processor 230 and/or the DSP 231. Other configurations, however, may be used to perform baseband processing.

The UE 200 may include the sensor(s) 213 that may include, for example, an Inertial Measurement Unit (IMU) 270, one or more magnetometers 271, and/or one or more environment sensors 272. The IMU 270 may comprise one or more inertial sensors, for example, one or more accelerometers 273 (e.g., collectively responding to acceleration of the UE 200 in three dimensions) and/or one or more gyroscopes 274. The magnetometer(s) may provide measurements to determine orientation (e.g., relative to magnetic north and/or true north) that may be used for any of a variety of purposes, e.g., to support one or more compass applications. The environment sensor(s) 272 may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the processor 230 in support of one or more applications such as, for example, applications directed to positioning and/or navigation operations.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the LMF 120 regarding the mobility of the UE 200. For example, based on the information obtained/measured by the sensor(s) 213, the UE 200 may notify/report to the LMF 120 that the UE 200 has detected movements or that the UE 200 has moved, and report the relative displacement/distance (e.g., via dead reckoning, or sensor-based location determination, or sensor-assisted location determination enabled by the sensor(s) 213). In another example, for relative positioning information, the sensors/IMU can be used to determine the angle and/or orientation of the other device with respect to the UE 200, etc.

The IMU 270 may be configured to provide measurements about a direction of motion and/or a speed of motion of the UE 200, which may be used in relative location determination. For example, the one or more accelerometers 273 and/or the one or more gyroscopes 274 of the IMU 270 may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) 273 and gyroscope(s) 274 taken after this moment in time may be used in dead reckoning to determine present location of the UE 200 based on movement (direction and distance) of the UE 200 relative to the reference location.

The magnetometer(s) 271 may determine magnetic field strengths in different directions which may be used to determine orientation of the UE 200. For example, the orientation may be used to provide a digital compass for the UE 200. The magnetometer(s) 271 may include a two-dimensional magnetometer configured to detect and provide indications of magnetic field strength in two orthogonal dimensions. Also or alternatively, the magnetometer(s) 271 may include a three-dimensional magnetometer configured to detect and provide indications of magnetic field strength in three orthogonal dimensions. The magnetometer(s) 271 may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a transmitter 242 and receiver 244 coupled to one or more antennas 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. Thus, the transmitter 242 may include multiple transmitters that may be discrete components or combined/integrated components, and/or the receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), V2C (Uu), IEEE 802.11 (including IEEE 802.11p), WiFi, WiFi Direct (WiFi-D), Bluetooth®, Zigbee etc. NR systems may be configured to operate on different frequency layers such as FR1 (e.g., 410-7125 MHz) and FR2 (e.g., 24.25-52.6 GHz), and may extend into new bands such as sub-6 GHz and/or 100 GHz and higher (e.g., FR2x, FR3, FR4). The wired transceiver 250 may include a transmitter 252 and a receiver 254 configured for wired communication. e.g., with the network 135 to send communications to, and receive communications from, the gNB 110a, for example. The transmitter 252 may include multiple transmitters that may be discrete components or combined/integrated components, and/or the receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The antenna 262 is configured to transduce the wireless signals 260 to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS imager), a lens, analog-to-digital circuitry, frame buffers, etc. Additional processing, conditioning, encoding, and/or compression of signals representing captured images may be performed by the general-purpose processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position (motion) device (PMD) 219 may be configured to determine a position and possibly motion of the UE 200. For example, the PMD 219 may communicate with, and/or include some or all of, the SPS receiver 217. The PMD 219 may also or alternatively be configured to determine location of the UE 200 using terrestrial-based signals (e.g., at least some of the signals 248) for trilateration, for assistance with obtaining and using the SPS signals 260, or both. The PMD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PMD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the processor 230 and/or the DSP 231) may be configured to use to determine motion (e.g., a velocity vector and/or an acceleration vector) of the UE 200. The PMD 219 may be configured to provide indications of uncertainty and/or error in the determined position and/or motion.

Figure 3:
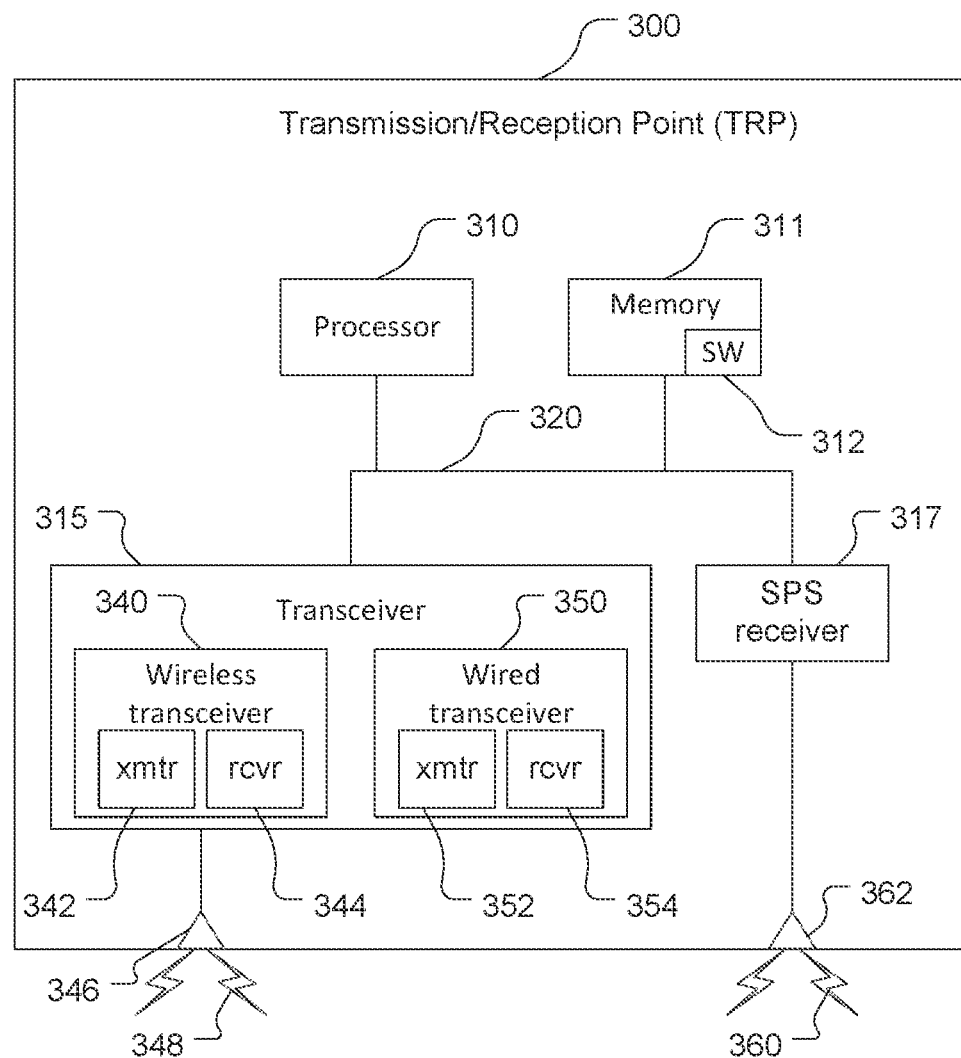
FIG. 3 is a block diagram of components of an example transmission/reception point shown in FIG. 1.

Referring also to FIG. 3, an example of a TRP 300 of the BSs 110a, 110b, 114 comprises a computing platform including a processor 310, memory 311 including software (SW) 312, a transceiver 315, and (optionally) an SPS receiver 317. The processor 310, the memory 311, the transceiver 315, and the SPS receiver 317 may be communicatively coupled to each other by a bus 320 (which may be configured, e.g., for optical and/or electrical communication). One or more of the shown apparatus (e.g., a wireless interface and/or the SPS receiver 317) may be omitted from the TRP 300. The SPS receiver 317 may be configured similarly to the SPS receiver 217 to be capable of receiving and acquiring SPS signals 360 via an SPS antenna 362. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 is a non-transitory storage medium that may include random access memory (RAM)), flash memory, disc memory, and/or read-only memory (ROM), etc. The memory 311 stores the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions. The description may refer only to the processor 310 performing a function, but this includes other implementations such as where the processor 310 executes software and/or firmware. The description may refer to the processor 310 performing a function as shorthand for one or more of the processors contained in the processor 310 performing the function. The description may refer to the TRP 300 performing a function as shorthand for one or more appropriate components of the TRP 300 (and thus of one of the BSs 110a, 110b, 114) performing the function. The processor 310 may include a memory with stored instructions in addition to and/or instead of the memory 311. Functionality of the processor 310 is discussed more fully below.

The transceiver 315 may include a wireless transceiver 340 and a wired transceiver 350 configured to communicate with other devices through wireless connections and wired connections, respectively. For example, the wireless transceiver 340 may include a transmitter 342 and receiver 344 coupled to one or more antennas 346 for transmitting (e.g., on one or more uplink channels) and/or receiving (e.g., on one or more downlink channels) wireless signals 348 and transducing signals from the wireless signals 348 to wired (e.g., electrical and/or optical) signals and from wired (e.g., electrical and/or optical) signals to the wireless signals 348. Thus, the transmitter 342 may include multiple transmitters that may be discrete components or combined/integrated components, and/or the receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 350 may include a transmitter 352 and a receiver 354 configured for wired communication, e.g., with the network 140 to send communications to, and receive communications from, the LMF 120 or other network server, for example. The transmitter 352 may include multiple transmitters that may be discrete components or combined/integrated components, and/or the receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the invention, including the claims, and other configurations may be used. For example, the description herein discusses that the TRP 300 is configured to perform or performs several functions, but one or more of these functions may be performed by the LMF 120 and/or the UE 200 (i.e., the LMF 120 and/or the UE 200 may be configured to perform one or more of these functions).

Figure 4:
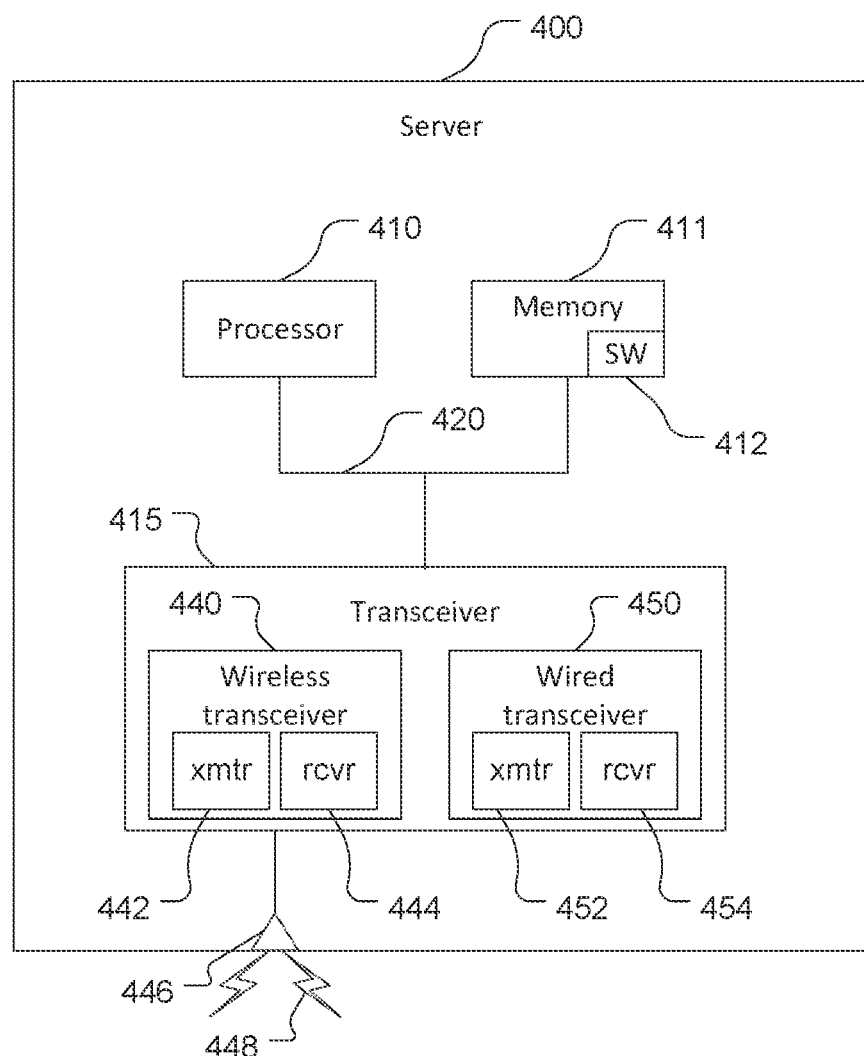
FIG. 4 is a block diagram of components of an example server shown in FIG. 1.

Referring also to FIG. 4, an example server, such as the LMF 120, comprises a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless interface) may be omitted from the server 400. The processor 410 may include one or more intelligent hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 2). The memory 411 is a non-transitory storage medium that may include random access memory (RAM)), flash memory, disc memory, and/or read-only memory (ROM), etc. The memory 411 stores the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description may refer only to the processor 410 performing a function, but this includes other implementations such as where the processor 410 executes software and/or firmware. The description may refer to the processor 410 performing a function as shorthand for one or more of the processors contained in the processor 410 performing the function. The description may refer to the server 400 (or the LMF 120) performing a function as shorthand for one or more appropriate components of the server 400 performing the function. The processor 410 may include a memory with stored instructions in addition to and/or instead of the memory 411. Functionality of the processor 410 is discussed more fully below.

The transceiver 415 may include a wireless transceiver 440 and a wired transceiver 450 configured to communicate with other devices through wireless connections and wired connections, respectively. For example, the wireless transceiver 440 may include a transmitter 442 and receiver 444 coupled to one or more antennas 446 for transmitting (e.g., on one or more downlink channels) and/or receiving (e.g., on one or more uplink channels) wireless signals 448 and transducing signals from the wireless signals 448 to wired (e.g., electrical and/or optical) signals and from wired (e.g., electrical and/or optical) signals to the wireless signals 448. Thus, the transmitter 442 may include multiple transmitters that may be discrete components or combined/integrated components, and/or the receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 450 may include a transmitter 452 and a receiver 454 configured for wired communication, e.g., with the network 135 to send communications to, and receive communications from, the TRP 300, for example. The transmitter 452 may include multiple transmitters that may be discrete components or combined/integrated components, and/or the receiver 454 may include multiple receivers that may be discrete components or combined/integrated components. The wired transceiver 450 may be configured, e.g., for optical communication and/or electrical communication.

The configuration of the server 400 shown in FIG. 4 is an example and not limiting of the invention, including the claims, and other configurations may be used. For example, the wireless transceiver 440 may be omitted. Also or alternatively, the description herein discusses that the server 400 is configured to perform or performs several functions, but one or more of these functions may be performed by the TRP 300 and/or the UE 200 (i.e., the TRP 300 and/or the UE 200 may be configured to perform one or more of these functions).

Figures 5A, 5B:
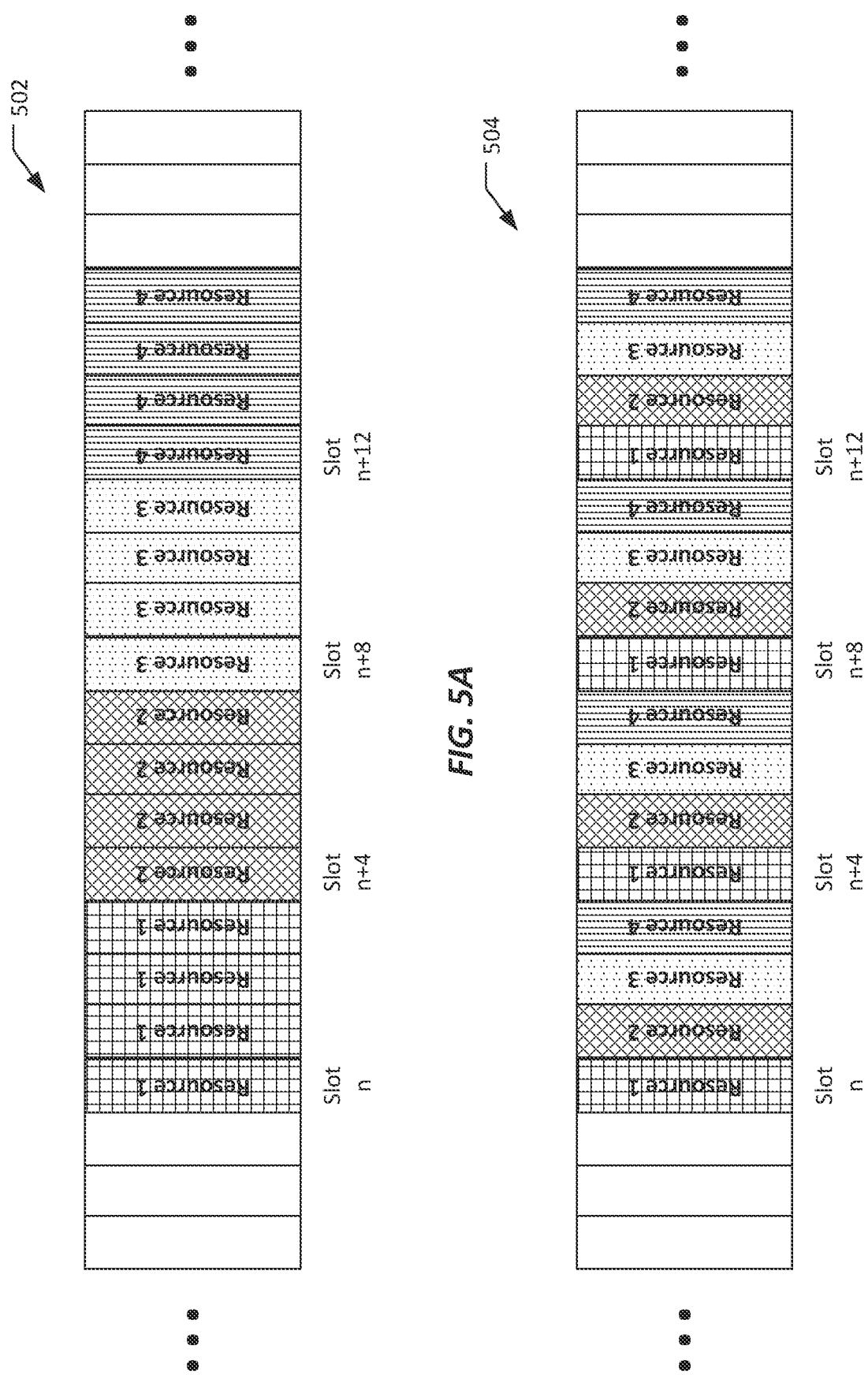
FIGS. 5A and 5B illustrate example downlink positioning reference signal resource sets.

Referring to FIGS. 5A and 5B, example downlink PRS resource sets are shown. In general, a PRS resource set is a collection of PRS resources across one base station (e.g., TRP 300) which have the same periodicity, a common muting pattern configuration and the same repetition factor across slots. A first PRS resource set 502 includes 4 resources and a repetition factor of 4, with a time-gap equal to 1 slot. A second PRS resource set 504 includes 4 resources and a repetition factor of 4 with a time-gap equal to 4 slots. The repetition factor indicates the number of times each PRS resource is repeated in each single instance of the PRS resource set (e.g., values of 1, 2, 4, 6, 8, 16, 32). The time-gap represents the offset in units of slots between two repeated instances of a PRS resource corresponding to the same PRS resource ID within a single instance of the PRS resource set (e.g., values of 1, 2, 4, 8, 16, 32). The time duration spanned by one PRS resource set containing repeated PRS resources does not exceed PRS-periodicity. The repetition of a PRS resource enables receiver beam sweeping across repetitions and combining RF gains to increase coverage. The repetition may also enable intra-instance muting.

Figure 6:
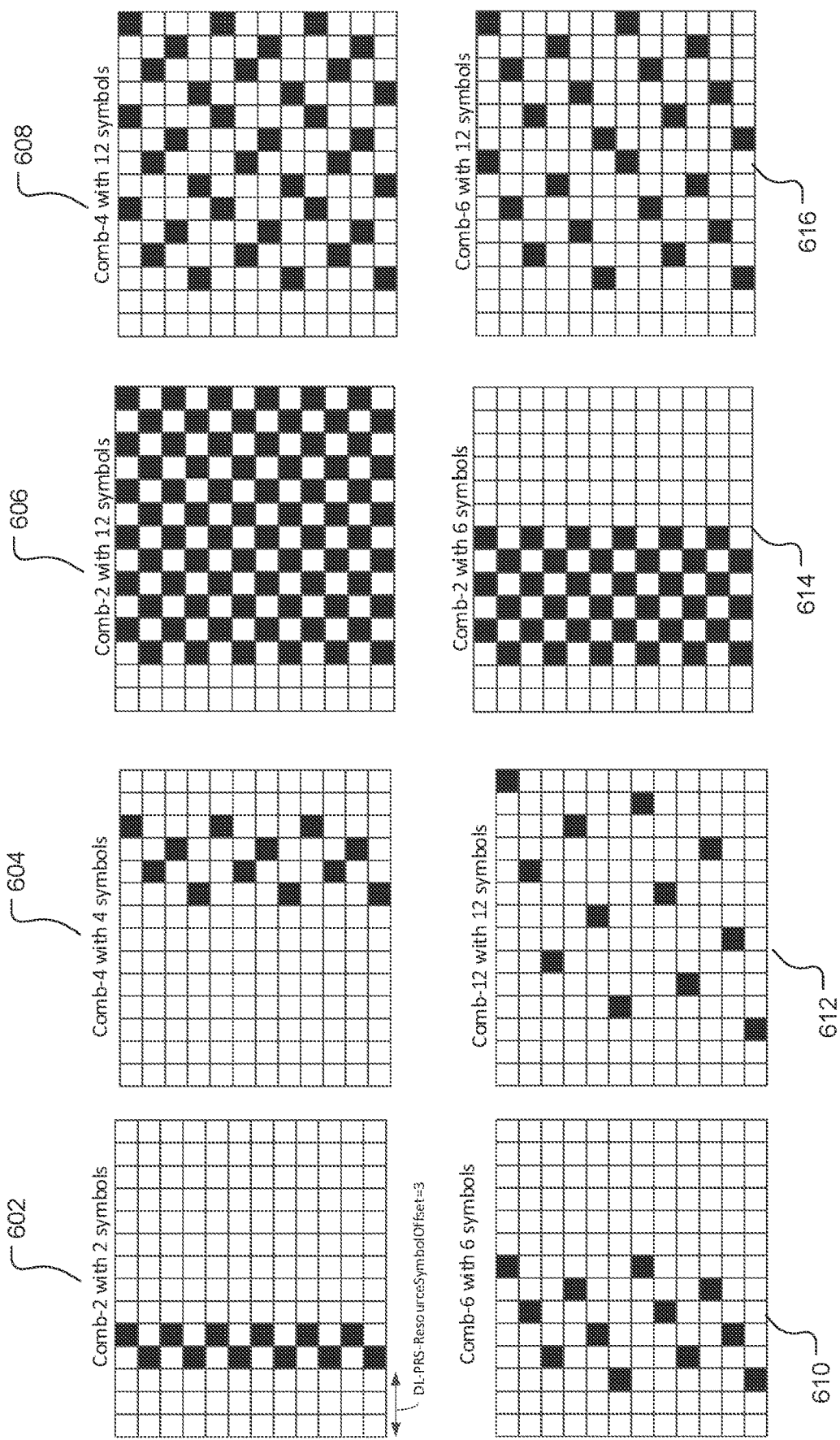
FIG. 6 is an illustration of example subframe formats for positioning reference signal transmission.

Referring to FIG. 6, example subframe and slot formats for positioning reference signal transmissions are shown. The example subframe and slot formats are included in the PRS resource sets depicted in FIGS. 5A and 5B. The subframes and slot formats in FIG. 6 are examples and not limitations and include a comb-2 with 2 symbols format 602, a comb-4 with 4 symbols format 604, a comb-2 with 12 symbols format 606, a comb-4 with 12 symbols format 608, a comb-6 with 6 symbols format 610, a comb-12 with 12 symbols format 612, a comb-2 with 6 symbols format 614, and a comb-6 with 12 symbols format 616. In general, a subframe may include 14 symbol periods with indices 0 to 13. The subframe and slot formats may be used for a Physical Broadcast Channel (PBCH). Typically, a base station may transmit the PRS from antenna port 6 on one or more slots in each subframe configured for PRS transmission. The base station may avoid transmitting the PRS on resource elements allocated to the PBCH, a primary synchronization signal (PSS), or a secondary synchronization signal (SSS) regardless of their antenna ports. The cell may generate reference symbols for the PRS based on a cell ID, a symbol period index, and a slot index. Generally, a UE may be able to distinguish the PRS from different cells.

A base station may transmit the PRS over a particular PRS bandwidth, which may be configured by higher layers. The base station may transmit the PRS on subcarriers spaced apart across the PRS bandwidth. The base station may also transmit the PRS based on the parameters such as PRS periodicity TPRS, subframe offset PRS, and PRS duration NPRS. PRS periodicity is the periodicity at which the PRS is transmitted. The PRS periodicity may be, for example, 160, 320, 640 or 1280 ms. Subframe offset indicates specific subframes in which the PRS is transmitted. And PRS duration indicates the number of consecutive subframes in which the PRS is transmitted in each period of PRS transmission (PRS occasion). The PRS duration may be, for example, 1, 2, 4 or 6 ms.

The PRS periodicity TPRS and the subframe offset PRS may be conveyed via a PRS configuration index IPRS. The PRS configuration index and the PRS duration may be configured independently by higher layers. A set of NPRS consecutive subframes in which the PRS is transmitted may be referred to as a PRS occasion. Each PRS occasion may be enabled or muted, for example, the UE may apply a muting bit to each cell. A PRS resource set is a collection of PRS resources across a base station which have the same periodicity, a common muting pattern configuration, and the same repetition factor across slots (e.g., 1, 2, 4, 6, 8, 16, 32 slots).

In general, the PRS resources depicted in FIGS. 5A and 5B may be a collection of resource elements that are used for transmission of PRS. The collection of resource elements can span multiple physical resource blocks (PRBs) in the frequency domain and N (e.g., 1 or more) consecutive symbol(s) within a slot in the time domain. In a given OFDM symbol, a PRS resource occupies consecutive PRBs. A PRS resource is described by at least the following parameters: PRS resource identifier (ID), sequence ID, comb size-N, resource element offset in the frequency domain, starting slot and starting symbol, number of symbols per PRS resource (i.e., the duration of the PRS resource), and QCL information (e.g., QCL with other DL reference signals). Currently, one antenna port is supported. The comb size indicates the number of subcarriers in each symbol carrying PRS. For example, a comb-size of comb-4 means that every fourth subcarrier of a given symbol carries PRS.

A PRS resource set is a set of PRS resources used for the transmission of PRS signals, where each PRS resource has a PRS resource ID. In addition, the PRS resources in a PRS resource set are associated with the same transmission-reception point (e.g., a TRP 300). Each of the PRS resources in the PRS resource set have the same periodicity, a common muting pattern, and the same repetition factor across slots. A PRS resource set is identified by a PRS resource set ID and may be associated with a particular TRP (identified by a cell ID) transmitted by an antenna panel of a base station. A PRS resource ID in a PRS resource set may be associated with an omnidirectional signal, and/or with a single beam (and/or beam ID) transmitted from a single base station (where a base station may transmit one or more beams). Each PRS resource of a PRS resource set may be transmitted on a different beam and as such, a PRS resource, or simply resource can also be referred to as a beam. Note that this does not have any implications on whether the base stations and the beams on which PRS are transmitted are known to the UE.

Figure 7:
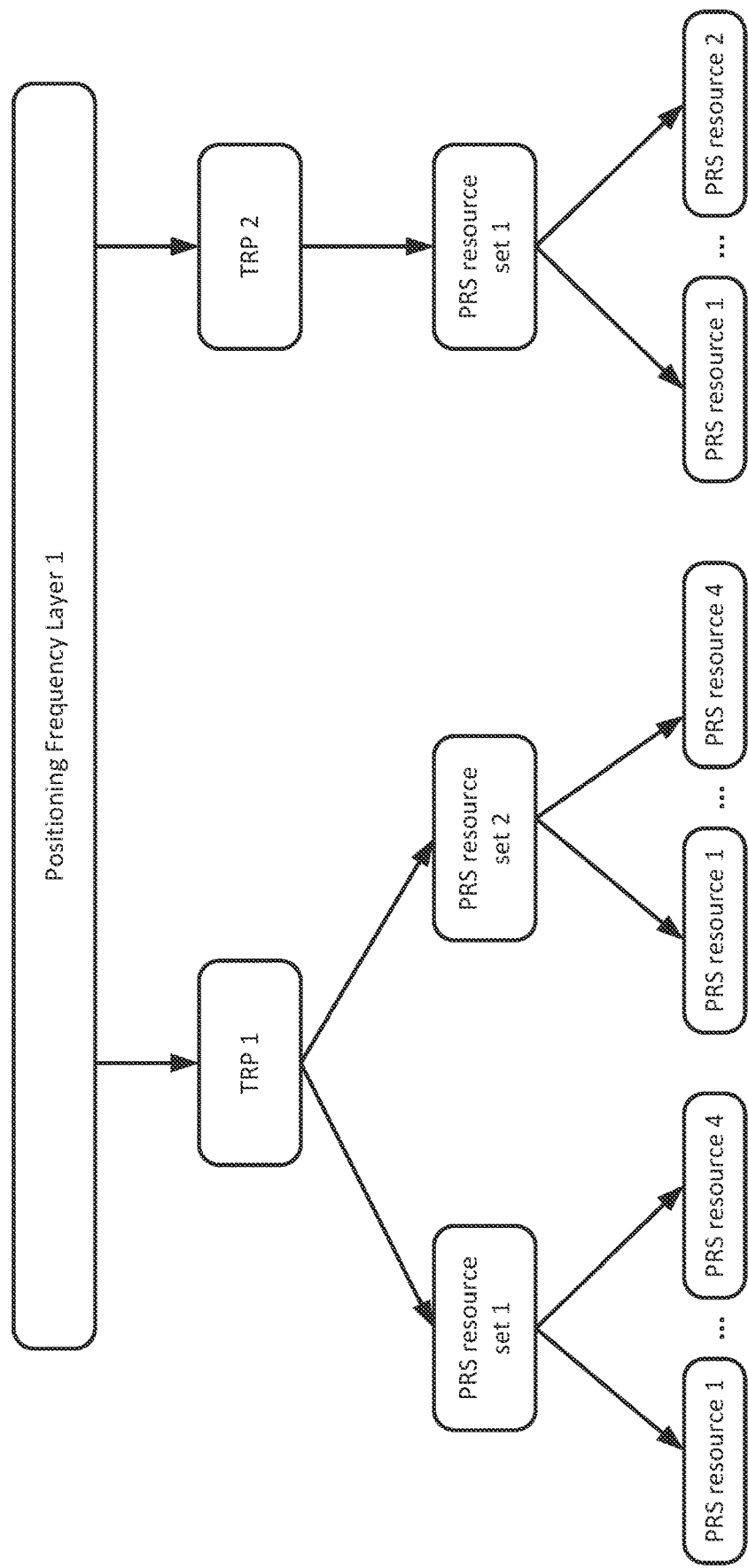
FIG. 7 is a conceptual diagram of an example positioning frequency layer.

Referring to FIG. 7, a conceptual diagram of an example positioning frequency layer 700 is shown. In an example, the positioning frequency layer 700 may be a collection of PRS resource sets across one or more TRPs. The positioning frequency layer may have the same subcarrier spacing (SCS) and cyclic prefix (CP) type, the same point-A, the same value of DL PRS Bandwidth, the same start PRB, and the same value of comb-size. The numerologies supported for PDSCH may be supported for PRS. Each of the PRS resource sets in the positioning frequency layer 700 is a collection of PRS resources across one TRP which have the same periodicity, a common muting pattern configuration, and the same repetition factor across slots.

Note that the terms positioning reference signal and PRS are reference signals that can be used for positioning, such as but not limited to, PRS signals, navigation reference signals (NRS) in 5G, downlink position reference signals (DL-PRS), uplink position reference signals (UL-PRS), tracking reference signals (TRS), cell-specific reference signals (CRS), channel state information reference signals (CSI-RS), primary synchronization signals (PSS), secondary synchronization signals (SSS), sounding reference signals (SRS), etc.

The ability of a UE to process PRS signals may vary based on the capabilities of the UE. In general, however, industry standards may be developed to establish a common PRS capability for UEs in a network. For example, existing industry standard may require that a duration of DL PRS symbol in units of milliseconds (ms) a UE can process every T ms assuming a maximum DL PRS bandwidth in MHz, which is supported and reported by UE. As examples, and not limitations, the maximum DL PRS bandwidth for the FR1 bands may be 5, 10, 20, 40, 50, 80, 100 MHz, and for the FR2 bands may be 50, 100, 200, 400 MHz. The standards may also indicate a DL PRS buffering capability as a Type 1 (i.e., sub-slot/symbol level buffering), or a Type 2 (i.e., slot level buffering). The common UE capabilities may indicate a duration of DL PRS symbols N in units of ms a UE can process every T ms assuming maximum DL PRS bandwidth in MHz, which is supported and reported by a UE. Example T values may include 8, 16, 20, 30, 40, 80, 160, 320, 640, 1280 ms, and example N values may include 0.125, 0.25, 0.5, 1, 2, 4, 6, 8, 12, 16, 20, 25, 30, 32, 35, 40, 45, 50 ms. A UE may be configured to report a combination of (N, T) values per band, where N is a duration of DL PRS symbols in ms processed every T ms for a given maximum bandwidth (B) in MHz supported by a UE. In general, a UE may not be expected to support a DL PRS bandwidth that exceeds the reported DL PRS bandwidth value. The UE DL PRS processing capability may be defined for a single positioning frequency layer 700. The UE DL PRS processing capability may be agnostic to DL PRS comb factor configurations such as depicted in FIG. 6. The UE processing capability may indicate a maximum number of DL PRS resources that a UE can process in a slot under it. For example, the maximum number for FR1 bands may be 1, 2, 4, 6, 8, 12, 16, 24, 32, 48, 64 for each SCS: 15 kHz, 30 kHz, 60 kHz, and the maximum number for the FR2 bands may be 1, 2, 4, 6, 8, 12, 16, 24, 32, 48, 64 for each SCS: 15 kHz, 30 kHz, 60 kHz, 120 kHz.

Industry standards for higher frequencies (e.g., millimeter wave (mmW)), such as FR4 (i.e., 52.6 GHz-114.25 GHz) may utilize different DL PRS resources and bandwidth parts to provide DL PRS to a UE. The UE antenna arrays and increased bandwidths utilized in mmW applications may impact the transmit and receive beam patterns associated with different bandwidth parts.

Figure 8:
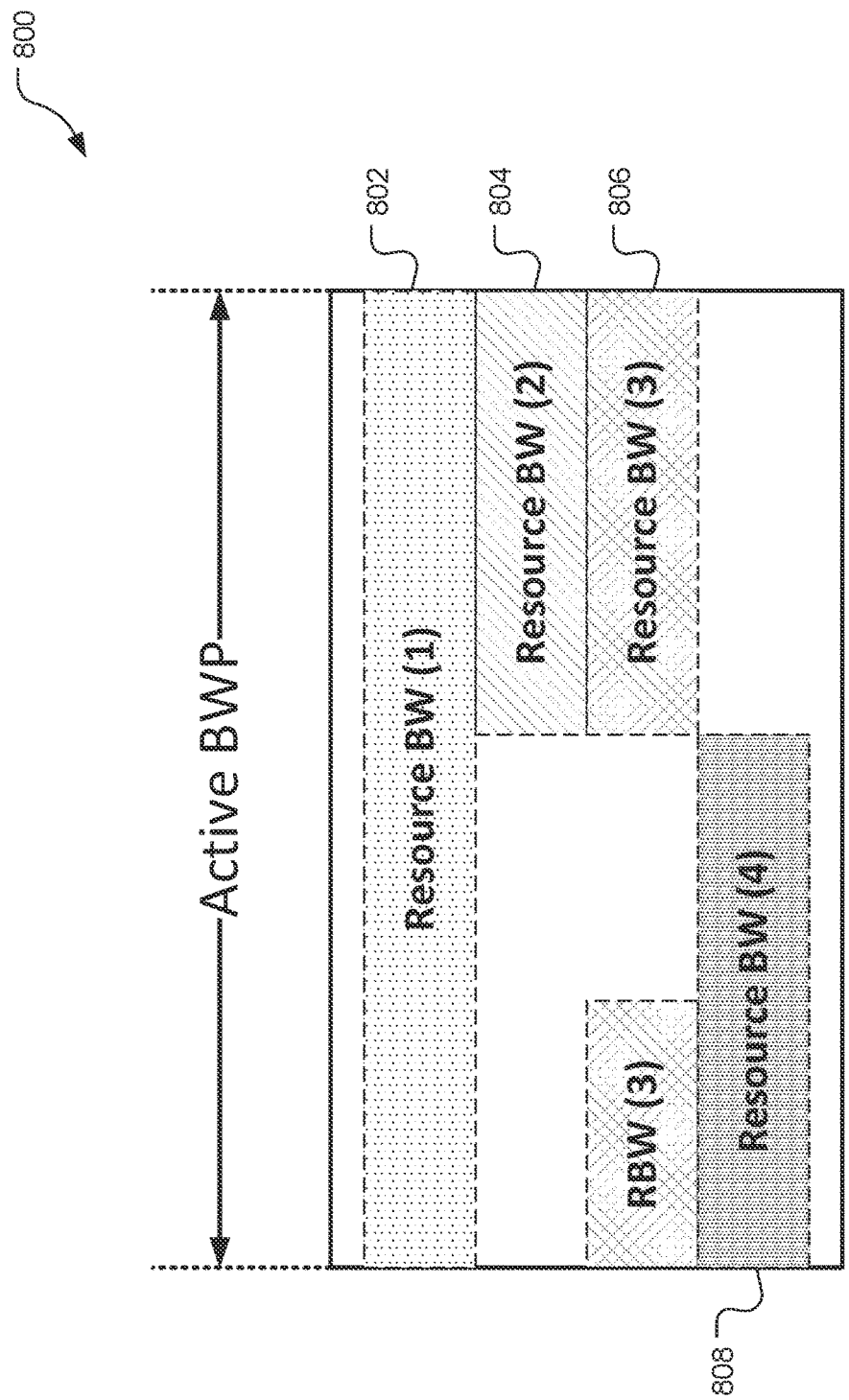
FIG. 8 is a conceptual diagram of an example active bandwidth part with multiple bandwidth resources.

Referring to FIG. 8, an example bandwidth part 800 with a plurality of resource bandwidths is shown. In an embodiment, the beam pattern/shapes of signals transmitted from a UE may be associated with a bandwidth part and a resource bandwidth. In general, the bandwidth part (BWP) 800 represents a set of contiguous common resource blocks in the component carrier. In this illustration, the frequency of the BWP 800 is shown along the horizontal axis of FIG. 8. A BWP may be used to provide services to a UE which does not support the full channel bandwidth (i.e., when the channel bandwidths of a base station and a UE do not match). In an example, a UE may be configured with up to 4 DL BWPs per carrier and up to 4 UL BWPs per carrier. The UE may utilize DL and UL BWPs to transmit and receive signals such as a data channel, control channel CSI-RS, DL-PRS, UL-PRS (SRS), PUCCH, PUSCH, etc. The bandwidth part information, including one or more BWPs and associated resource BWs (RBWs) may be signaled by one or more System Information Blocks (SIBs) received from a base station. A UE may be configured with a default DL BWP and/or receive a parameter structure to configure an initial DL BWP (e.g., using the initialDownlinkBWP parameter structure defined in 3GPP TS 38.211). The parameters for UL BWPs may be received in the bandwidth part information (e.g., via SIBs or other dedicated signaling). A base station may dynamically switch the activated BWP (e.g., the Active BWP) via a Bandwidth Part Indicator field with a Downlink Control Information (DCI) signal.

The bandwidth part information defining the active BWP (i.e., the bandwidth part 800 that is currently active) may further include resource bandwidth information defining a plurality of resource BWs, such as a first resource BW 802, a second resource BW 804, a third resource BW 806, and a fourth resource BW 808. The terms resource BW, RBW, component carries and sub-band may be used interchangeably herein. In contrast to the delay associated with switching an active BWP, a base station may utilize DCI-based or Medium Access Control Control Elements (MAC-CE) signaling to quickly change between the resource BWs 802, 804, 806, 808. Radio Resource Control (RRC) signaling may be used to configure the resource BWs 802, 804, 806, 808 within the BWP 800. The BWP 800 is associated with radio parameters required for communication with the base station (e.g., PUCCH, PUSCH, PRS, SRS, PDSCH, PDCCH, DMRS, etc.) and when the Active BWP is switched, the UE may have to reconfigure internal radio parameters based on the new BWP. Each of the resource BWs 802, 804, 806, 808 inherits the signaling configuration from the Active BWP and may eliminate the need to retune RF components in some UEs. The resource BWs may cover all or some of the Active BWP. For example, the first resource BW 802 covers a significant portion of the Active BWP, and the second, third and fourth resource BW 804, 806, 808 cover smaller portions of the Active BWP. A resource BW may have disjointed coverage over the Active BWP. For example, the third resource BW 806 include areas on both edges of the Active BWP.

Figure 9A:
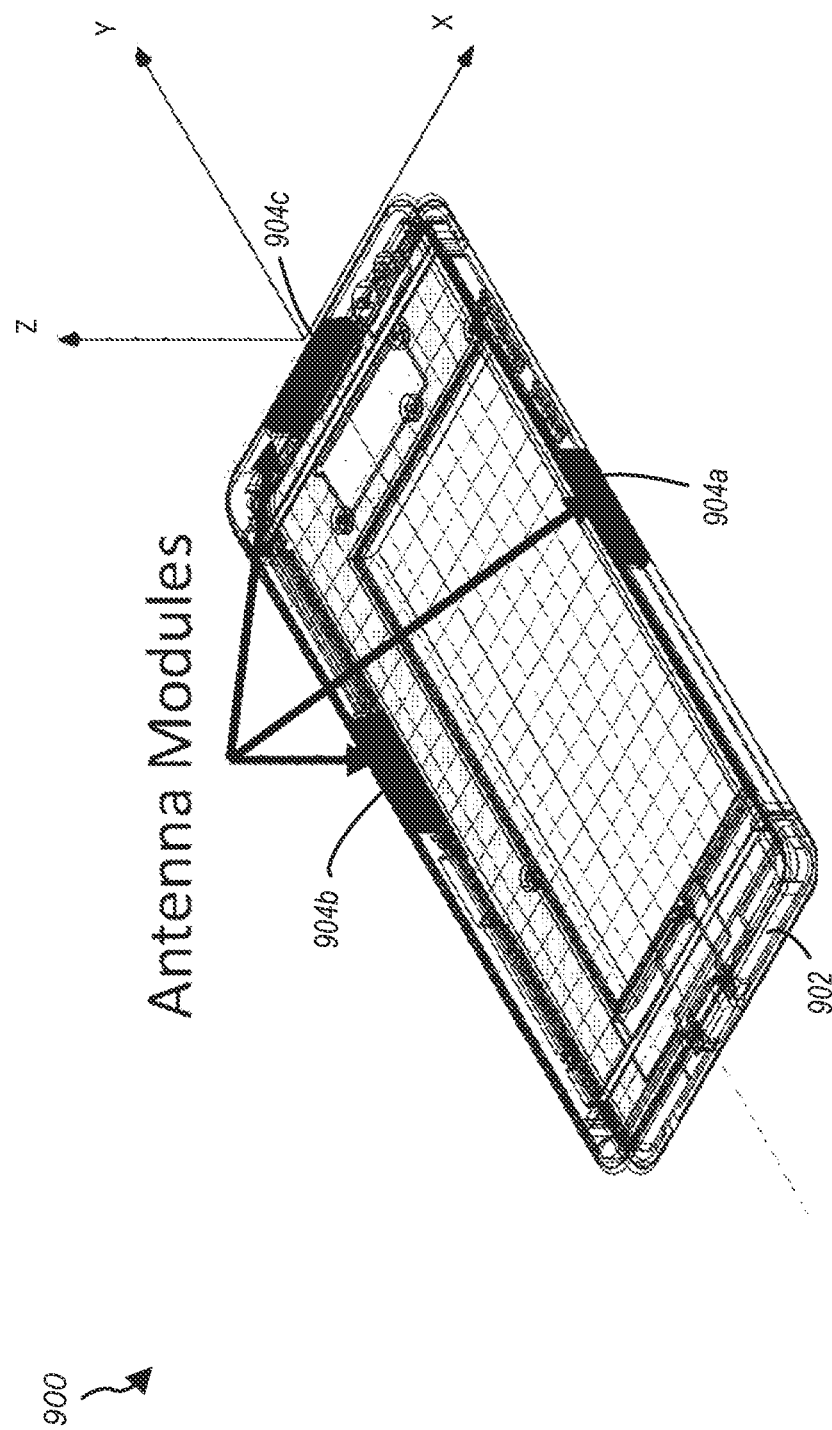
FIG. 9A is an example user equipment with a plurality of antenna modules.

Referring to FIG. 9A, a perspective view of multiple antenna modules 904*a-c* in an example user equipment 900 is shown. The UE 900 may include the features described above in the UE 200, but elements are not shown in FIG. 9A to highlight the example locations of the antenna modules 904*a-c*. The antenna modules 904*a-c* are examples of multi element patch, dipole, strip and/or other antenna array configurations used in mobile devices and configured for phased array transmissions and receptions (e.g., beam forming). Each of the antenna modules 904*a-c* may include an array of elements such as 1×4, 1×5, 1×8, 2×4, 2×5, 2×8, 3×8, etc. The dimensions and size of the arrays are examples only and may vary as operational frequencies increase. In general, beamforming capabilities (e.g., array gains) increase with increased array sizes. In an example, the UE 900 includes a frame 902 configured to receive the antenna modules 904*a-c* along the edges as depicted in FIG. 9A. The thickness of the edges of the UE 900 is an example only, and not a limitation, as the thickness and dimensions of the antenna modules 904*a-c* may vary based on technology and other market demands. For example, future wireless devices may have edge thicknesses that are less than 4.0 millimeters. The frame 902 may include one or more mounting assemblies configured to secure one or more antenna modules 904*a-c* along the edges to improve the coverage area of the UE 900. The multiple antenna modules 904*a-c* enable 3D operation such that each module may be configured to generate beams along different axes. The locations and number of the antenna modules 904*a-c* are examples only as different wireless devices may include antenna modules on different surfaces of the UE 900, and may have other edge features/controls such as volume, on/off, scroll wheels, etc. which may impact the antenna configuration. In general, as the operational frequency of mobile devices increases, the number of antenna elements in an antenna module may also increase. The increased number of elements may enable improved beamforming capabilities when dimensions and spacing of the antenna elements are tuned to a particular frequency. The higher frequencies may also increase the required operational bandwidth of a wireless channel and the beamforming capabilities of an antenna module may vary across the bandwidth. Further, the state of the UE 900 may impact the beamforming capabilities of the antenna modules 904*a-c*. For example, the UE 900 may be configured to modify the power output to one or more of the antenna modules 904*a-c* if it determines a user's hand is proximate to the first antenna module 904*a*. The presence of the user and orientation of the UE 900 relative to the user may also impact the beam patterns. Similarly, the presence of peripheral devices such as power cords, headphones, credit card readers, etc. may impact the beam patterns generated by one or more of the antenna modules 904*a-c*.

Figure 9B:
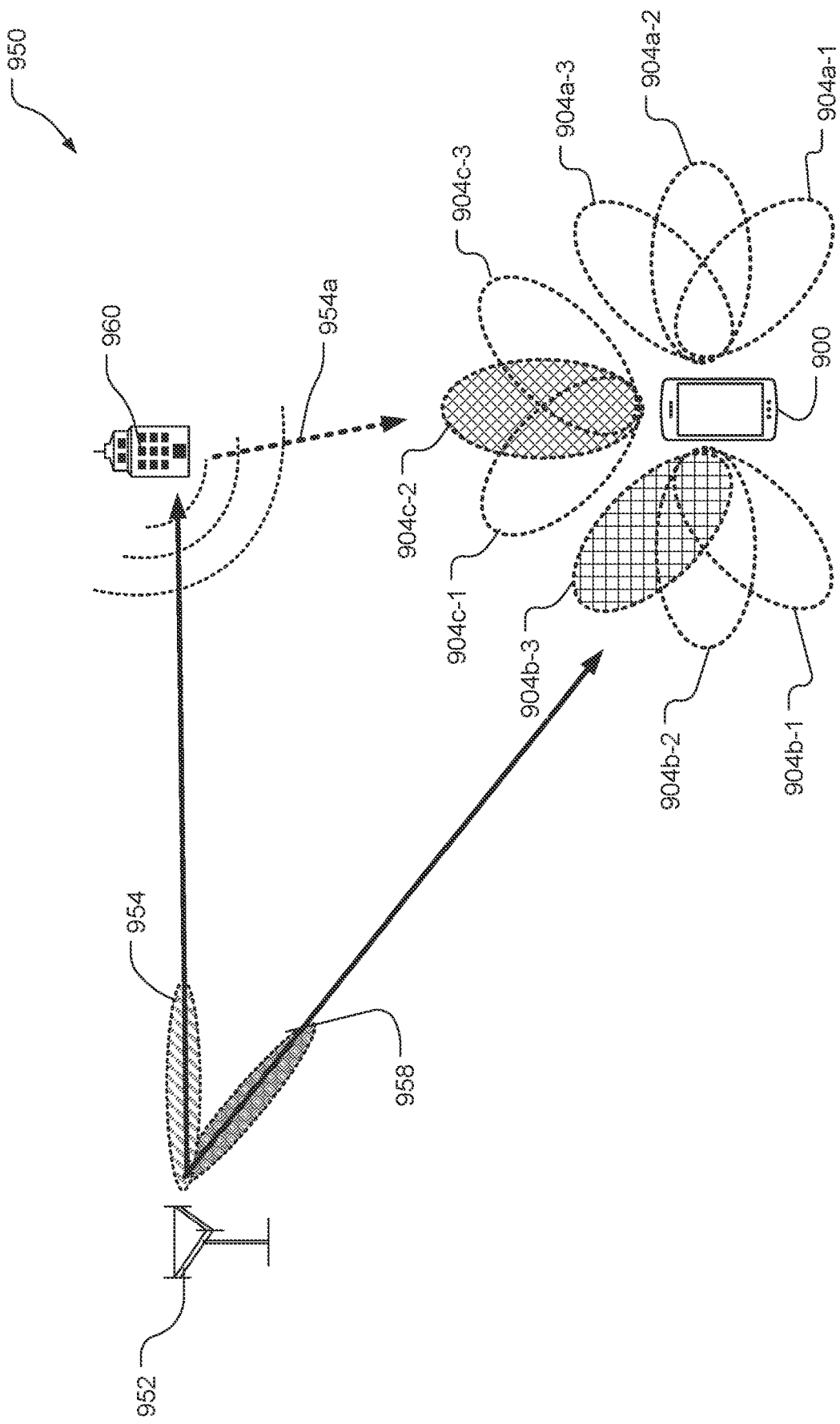
FIG. 9B is a conceptual diagram of example beam patterns based on the antenna modules in the user equipment of FIG. 9A.

Referring to FIG. 9B, a conceptual diagram 950 of example beam patterns based on the antenna modules 904*a-c* of the UE 900 are shown. The diagram 950 includes a base station 902 configured to transmit a plurality of beamformed signals such as a first beam 954 and a second beam 958. The base station 952 is an example of a TRP 300 such as the gNBs 110*a-b*, and the ng-eNB 114 configured for transmitting and receiving RF signals utilizing beamforming technologies. The UE 900 is also configured for transmitting and receiving RF signals utilizing the antenna modules 904*a-c* and the corresponding antenna tuning and phase shifters in the transceiver 240. The antenna modules 904*a-c* and/or the transceiver 250 may include at least one radio frequency integrated circuit (RFIC). The RFIC may be configured to adjust the power and/or the radiation beam patterns associated with the antenna modules 904*a-c*. The RFIC is an example of an antenna controller and may be configured to utilize phase shifters and/or hybrid antenna couplers to control the power directed to the antenna array and to control the resulting beam patterns. For example, the first antenna module 904*a* may be configured to generate three beams along three different axis such as a first beam 904*a*-1, a second beam 904*a*-2, and a third beam 904*a*-3. The pattern, number and orientations of the beams are examples only and not a limitation. Other antenna modules may be configured to generate beams on different axes and in different planes. The second antenna module 904*b* is configured to generate a first beam 904*b*-1, a second beam 904*b*-2, and a third beam 904*b*-3. The third antenna module 904*c* is configured to generate a first beam 904*c*-1, a second beam 904*c*-2, and a third beam 904*c*-3. Each of the beams from the respective antenna modules 904*a-c* may be configured to send and receive signals from the base station 952. The UE 900 is configured to generate beams based on tuning circuits and phase shifters such as an RFIC, and the corresponding codebook parameters associated with each of the beams.

The UE 900 may be positioned to receive one or more beams transmitted from the base station 952 with one or more of the antenna modules 904*a-c*. In an example, the base station 952 may be configured to transmit a first set of beamformed reference signals, such as DL-PRSs, in a first sub-band of a frequency layer (e.g., FR4, sub 6G, mmW band, etc.). The beam pattern and beam shapes of the first set of beamformed reference signals transmitted by the base station 952 are based in part on the frequencies of the first sub-band. The first sub-band may be a BWP, RBW, component carriers (CC), or other distribution of RBs in the frequency layer. The base station 952 is configured to generate the first set of beamformed reference signals based on tuning circuits and phase shifters, and the corresponding codebook parameters associated with each of the beams. For example, the first beam 954 may correspond to a first DL-PRS resource and have a peak in the array gain corresponding to the angle associated with a first reflector 960. The first reflector 960 may be a building or other structure which may cause a non-line of sight (NLOS) path 954*a* based on a reflection or refraction of the first beam 954. The UE 900 may receive the NLOS path 954*a* via the second beam 904*c*-2 on the third antenna module 904*c*. The second beam 958 may have a peak array gain angle (i.e., AoD) aimed at the UE 900, and the UE 900 may utilize the third beam 904*b*-3 of the second antenna module 904*b* to receive the second beam 958. In operation, the UE 900 may be configured to utilize the AoD and the AoA of the first and/or second beams 954, 958 in positioning computations. For example, the location of the base station 952 and the reflector 960 and the corresponding beam coverage areas associated with the AoDs may be known. The UE 900 may also be configured to utilize the relative angle between the receive beams (e.g., 904*b*-3, 904*c*-2) in the positioning calculations. Other measurements from the first and second beams 954, 958, as well as beams from other base stations (not shown in FIG. 9B) may also be used to determine a location based on multilateration and other ranging techniques (e.g., TDOA, RTT, RSSI, RSRP, etc.).

Figure 10A:
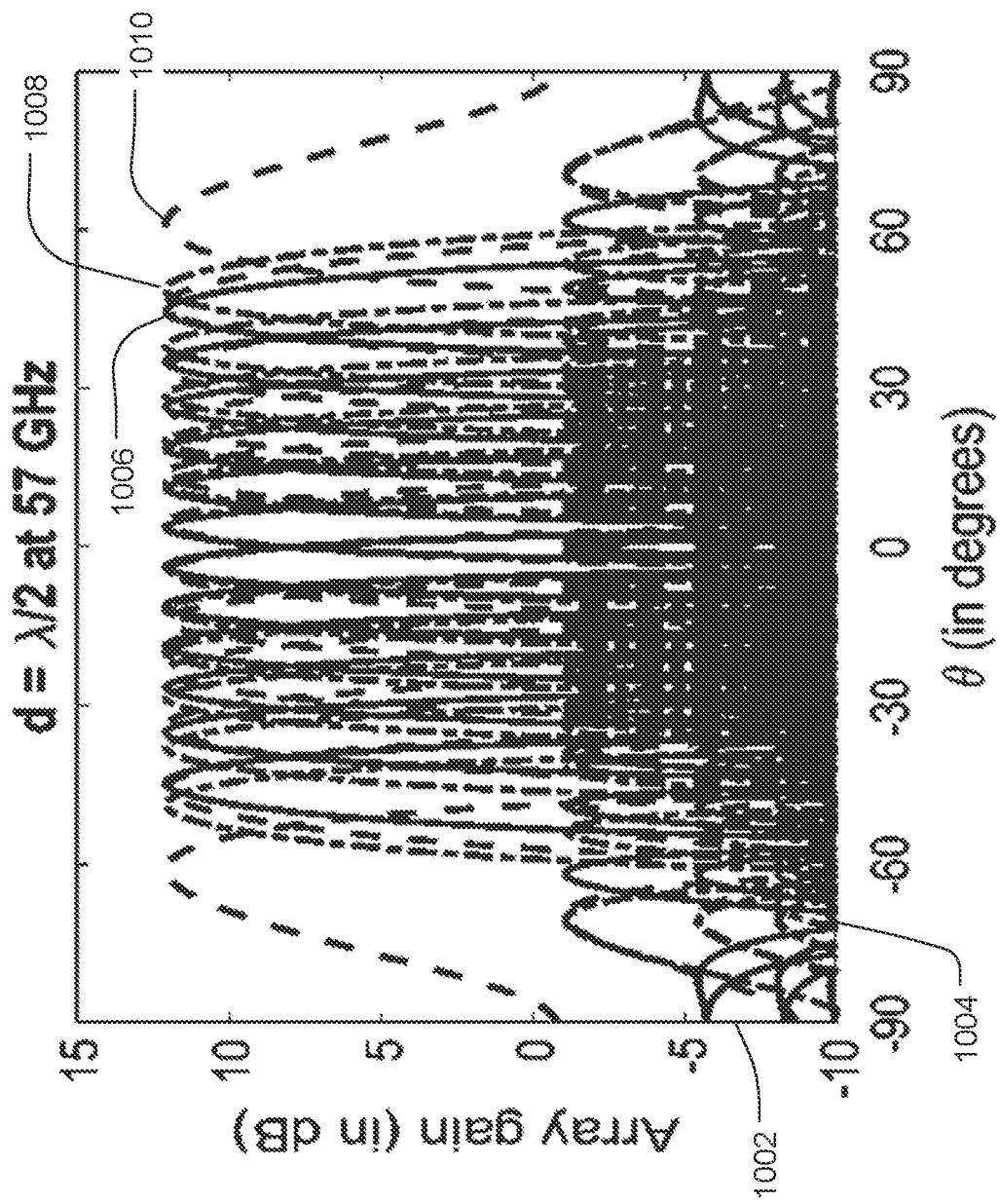
FIGS. 10A and 10B are graphical examples of beam squinting associated with antenna codebook designs.
Figure 10B:
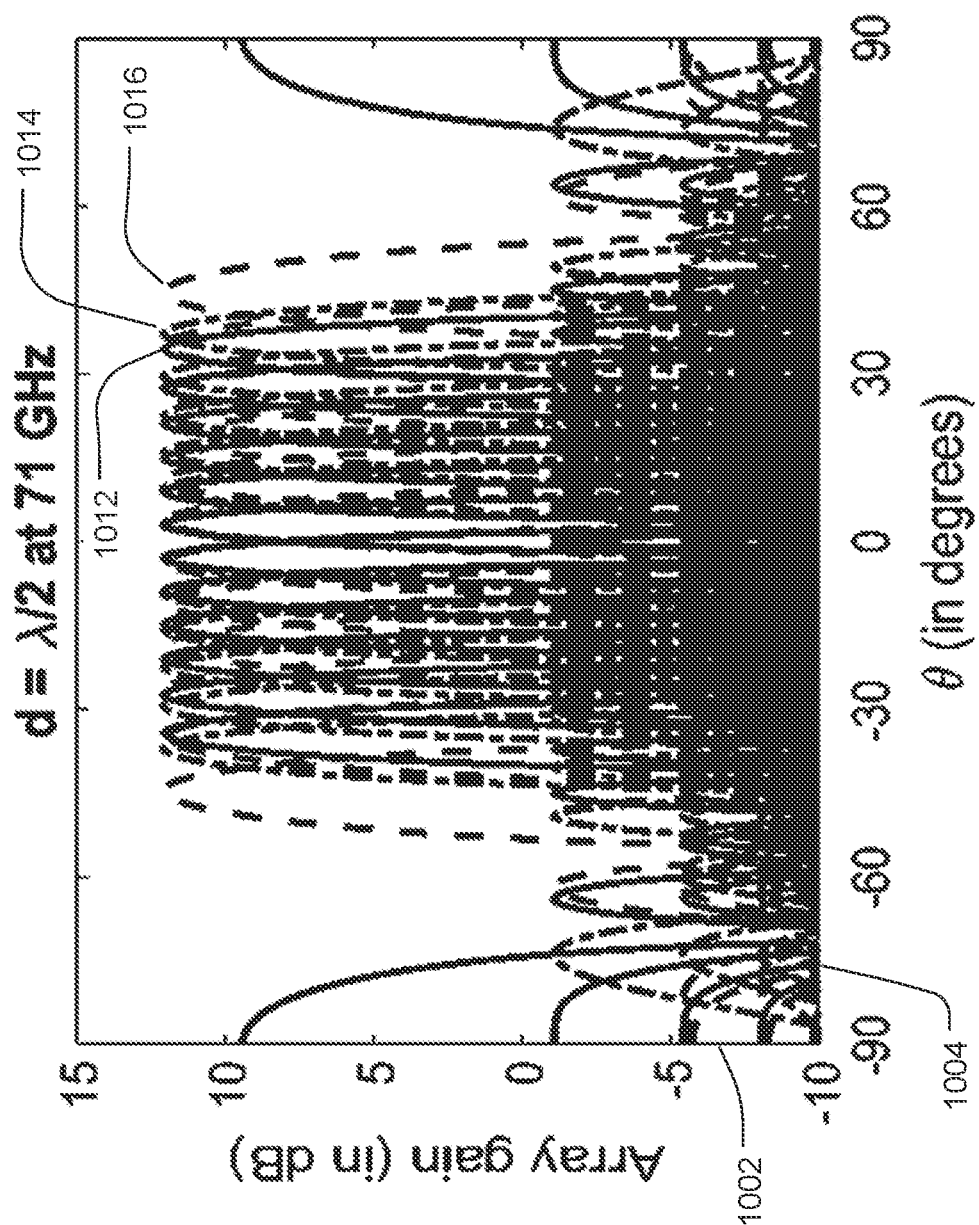

Referring to FIGS. 10A and 10B, graphical examples of beam squinting associated with antenna codebook designs are shown. The graphs in FIGS. 10A and 10B include an array gain axis 1002 and a spatial angle axis 1004, and represent beams generated by two example 16×1 arrays with element spacing equal to half a wavelength (i.e., d=λ/2) for 57 GHz (FIG. 10A) and 71 GHz (FIG. 10B). The antenna arrays are configured to cover +/−50 degrees around a boresight direction with a size-12 codebook. That is, each of the 12 beams in the 57 GHz array in FIG. 10A are based on the associated codebook parameters for that beam, and each of the 12 beams in the 71 GHz array in FIG. 10B are based on the associated codebook parameters for that beam. Each graph includes example gain and spatial angle values for three different frequencies: 57 GHz, 61 GHz, and 71 GHz. The different frequency values are examples of different sub-bands that may utilize the antenna modules 904*a-c*, and when the frequencies in the sub-bands are not the same as the preferred element spacing. That is, the wavelengths (λ) of the signals in the sub-band may be different than the d=λ/2 of the array spacing. Since the codebooks for the arrays are typically the same regardless of the frequency of the input signal (with codebook loading time dependent on the RF settling time which can be considerably high at mmWave carrier frequencies), the resulting angles at which peaks in array gains are seen can vary based on the different input signals. This effect is referred to as beam squinting. For example, referring to FIG. 10A where the array spacing is configured for d=λ/2 at 57 GHz, the peak angles for array gain with a 57 GHz signal 1006, are different than the peak angles for array gain with a 61 GHz signal 1008, which are different from the peak angles for array gain with a 71 GHz signal 1010. The impact of beam squinting may have a substantial impact of the beam pattern and shape the further the steering angle of the beam is away from the boresight of the array. For example, the outermost beams may vary approximately 20 degrees across the frequencies. In another example, referring to FIG. 10B where the array spacing is configured for d=λ/2 at 71 GHz, the peak angles for array gain with a 57 GHz signal 1012, are different than the peak angles for array gain with a 61 GHz signal 1014, which are different from the peak angles for array gain with a 71 GHz signal 1016.

The beam pattern plots in FIGS. 10A and 10B illustrate that the beams may not correlate well across different frequencies. A different beam index may provide better results at a different carrier frequency especially towards the edge of the antenna coverage where the differences in angles may be more significant across different frequencies. For example, depending on the steering angle of interest, beams from either 57 GHz or 71 GHz may provide improved signal strengths (e.g., gain differences may be significant ~2-3 dB). In an example, a smaller codebook size may be sufficient at $f_c$=71 GHz to cover the same area as that covered with $f_c$=57 GHz.

Figure 11A:
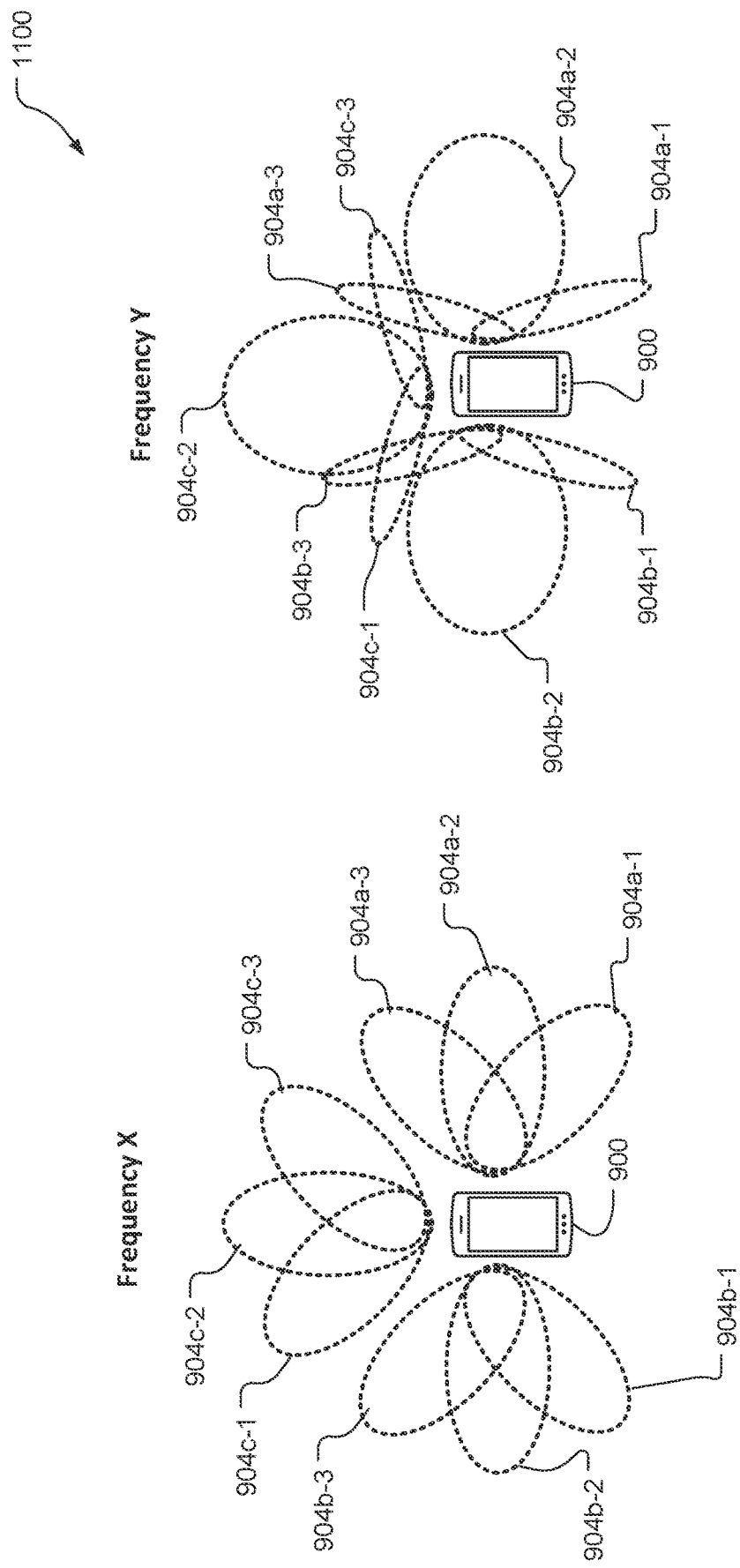
FIG. 11A is a conceptual diagram of example frequency dependent beam patterns.

Referring to FIG. 11A, a conceptual diagram 1100 of example frequency dependent beam patterns on the UE 900 using the antenna modules 904*a-c* is shown. The frequencies and beam patterns depicted in FIG. 11A are examples only and simplified to demonstrate the concepts of beam squinting on a mobile device. The frequencies may be associated with a BWP, RBW, CC, RB or other portions of the frequency domain used for wireless communications. In an example, a first frequency (i.e., Frequency X) may be based on a 57 GHz signal and a second frequency (i.e., Frequency Y) may be based on a 71 GHz signal. Since the antenna array elements in the antenna modules 904*a-c* are in fixed positions, the corresponding beam patterns are subject to beam squinting for the different frequencies. Thus, the beam shapes and beam angles may vary based on the different frequencies, such as depicted in the examples in FIG. 11A.

In an example, the beam weights associated with the different frequencies may be stored on the UE 900 and/or a network resource (e.g., LMF 120) and used in positioning computations. For example, the change in frequency from Frequency X to Frequency Y may change the corresponding AoD and AoA measurements for signals transmitted and received by the UE 900.

Figure 11B:
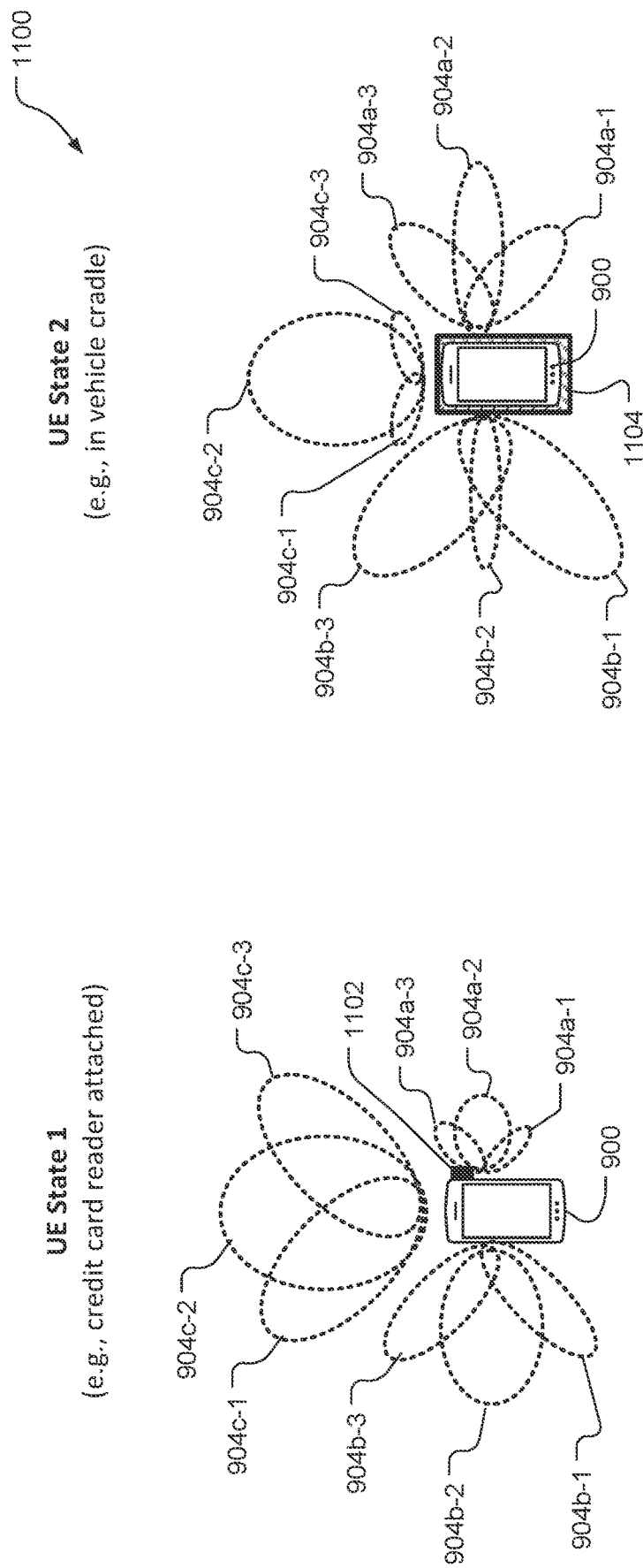
FIG. 11B is a conceptual diagram of example user equipment state dependent beam patterns.

Referring to FIG. 11B, a conceptual diagram 1100 of example user equipment state dependent beam patterns on the UE 900 using the antenna modules 904*a-c* is shown. The UE states and beam patterns depicted in FIG. 11B are examples only and simplified to demonstrate the concepts of state based beam configurations on a mobile device. The example beam patterns depicted in FIG. 11B may be associated with a sub-band, and the beam patterns for the states may be different for different sub-bands. The UE states may correspond with detectable hardware configurations and operational use cases. For example, frequency-modulated continuous-wave (FMCW) radar may be used to determine the relative distance between a user and the UE 900. Power regulation and radiation protection algorithms may be used to vary the beam patterns based on the proximity of a user (e.g., hands, head, pocket position, etc.). Other sensors may also be used to detect a state of the UE 900 relative to the user. The UE states may also include the use of peripheral devices such as card readers, headphones, device covers, power cables, etc. which may impact the beam patterns generated by the antenna modules 904*a-c*. A number of different UE states may be detected and associated with different beam patterns per each sub-band. For example a first UE state (i.e., UE State 1) includes a first beam pattern for the antenna modules 904*a-c* when a card reader 1102 is operably coupled to the UE 900. A second state (i.e., UE State 2) includes a second beam pattern for the antenna modules 904*a-c* when the UE 900 is in a cradle 1104. The card reader 1102 and the cradle 1104 are examples of peripherals which have a deterministic impact on the beam patterns generated by the antenna modules 904*a-c*. In an example, each UE state may utilize a different codebook (e.g., tuning and phase shifter parameters) to generate the beam patterns in the different sub-bands. In an example, the UE 900 may have a single codebook that is not dependent on the states, and the beam patterns for a sub-band may be based on the field effects caused by the peripherals. The resulting beam patterns for the antenna modules 904*a-c* may be characterized based on a combination of the frequency and the UE state.

Figure 12:
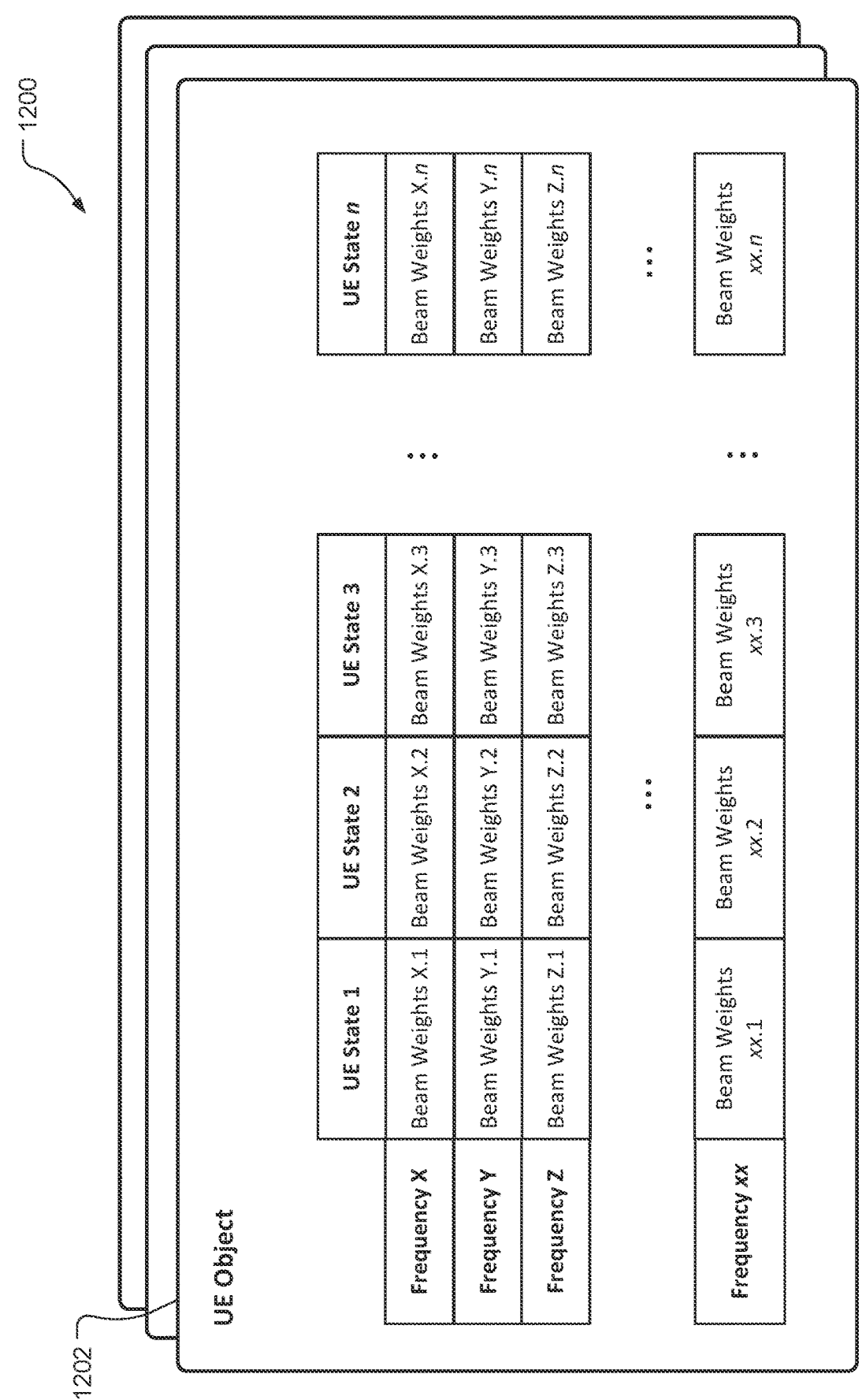
FIG. 12 is an example conceptual data structure for frequency and state based beam patterns.

Referring to FIG. 12, with further reference to FIGS. 11A and 11B, an example conceptual data structure 1200 for frequency and state based beam patterns is shown. The data structure may persist as a bit map, text table, or other computer readable format in the memory 211 in the UE 200, the memory 311 in the TRP 300, and/or the memory 411 in the server 400. The data structure 1200 may include a plurality of UE objects 1202 containing beam pattern information based on frequency and UE state parameters. For example, a UE object 1202 may be based on a UE device product line (e.g., manufacturer model number), a standard bill of materials, or other features that may be associated with the form or functions of a UE and used to categorize similar UEs. In an example, the UE object 1202 may be associated with a single UE (e.g., based on a serial number, user ID, or other unique identification). Each UE object 1202 may include a collection of beam weights to classify the antenna gains (e.g., beams) for combinations of frequencies and UE states. The frequencies may correspond to defined frequency layers, BWPs. RBWs, CC, RBs, or other ranges in the frequency domain. The frequencies in the data structure 1200 (e.g., Frequency X, Frequency Y, Frequency Z . . . Frequency xx) may be associated with one or more UE States (e.g., UE State 1, UE State 2, UE State 3 . . . UE State n). The UE States may correspond to detectable hardware configurations and operational use cases such as described in FIG. 11B. In an embodiment, each UE State 1 may be associated with a codebook such that the tuning and phase shifter parameters may vary for each UE State. In an embodiment, the codebook may be associated with the UE object 1202 and may be used for each of the UE State and Frequency combinations.

In operation, the beam weights (e.g., beam weights x.1, x.2, x.3, y.1, y.2 . . . xx.n) in the data structure 1200 can be used to indicate array gain information and a beam pattern for the respective frequency and state combinations. The beam weights may be used by the UE 200 and the network (e.g., gNB 110*a*. LMF 120) for positioning. For example, each of the beams defined by the beam weights may be associated with beam identification values and may be used by the UE 200 for computing AoAs based on DL-PRSs, and by the gNB 110*a* or the LMF 120 to determine AoDs for UL signals transmitted by the UE 200. The data structure 1200 may be provided to the network via wireless signaling such as via LPP/NPP protocols, Radio Resource Control (RRC), or other messaging interfaces.

Figure 13A:
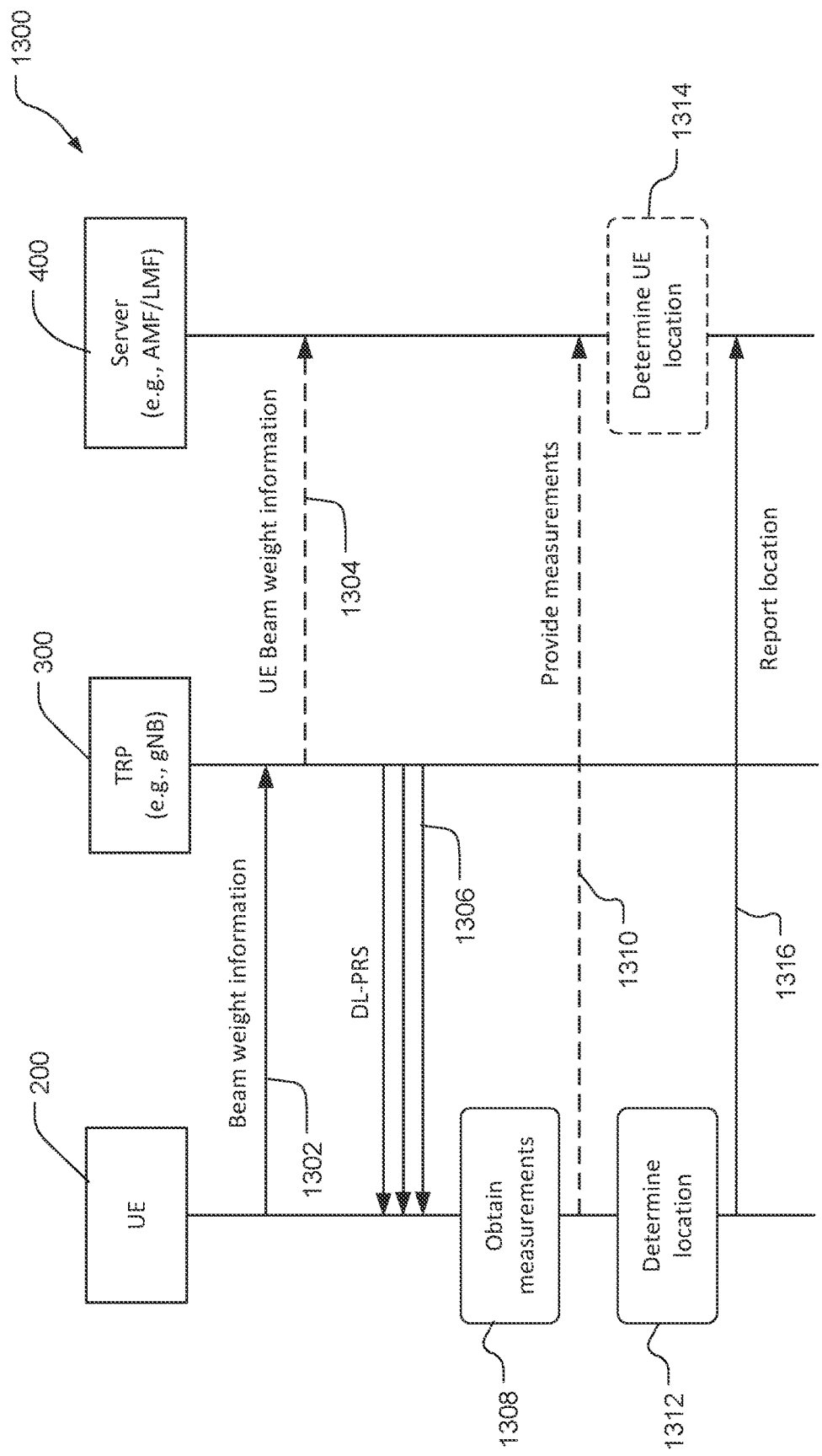
FIG. 13A is an example message flow for providing frequency and state dependent beam patterns for downlink based positioning.

Referring to FIG. 13A, an example message flow 1300 for providing frequency and state dependent beam patterns for downlink based positioning is shown. The message flow 1300 is an example only, and not a limitation, as other messages and signaling technologies may be used to propagate the frequency and state dependent beam patterns. In an embodiment, the message flow 1300 includes a UE 200, a TRP 300, and at least one server 400. In a 5G NR network, such as the communication system 100, the TRP 300 may be a gNB 110*a-b* and the server 400 may be one or more of the AMF 115 and the LMF 120. The UE 200 may include configuration data associated with antenna gain and beam performance in different frequencies and UE states. The beam weights in the data structure 1200 may be used to generate beam pattern information associated with various UE states and one or more sub-bands such as BWPs, RBW, CC, or RBs used in network DL-PRS configurations. In an example, each of the PRS resources in the positioning frequency layer 700 may be associated with one or more sub-bands. The UE 200 may be configured to provide assistance data including the frequency and state based antenna array gain distributions such as in the data structure 1200 in one or more beam weight information messages 1302. The provided beam weight information messages 1302 may be provided via messaging utilizing wireless protocols such as LPP, NRPP, RRC messaging, or other signaling interfaces. In an example, the TRP 300 may be configured to provide the beam weight information to the LMF 120 in one or more UE beam weight information messages 1304.

The TRP 300 is configured to transmit one or more reference signals 1306 (e.g., DL-PRSs) in a sub-band, and at stage 1308, the UE 200 may be configured to obtain measurements of the reference signals 1306 utilizing frequency and state based receive beams. The receive beams are based on the beam weights corresponding to the current state of the UE 200 and the sub-band the DL-PRSs 1306 are transmitted in. The UE 200 may receive DL-PRSs from other TRPs (not shown in FIG. 13A) and obtain additional measurements at stage 1308 based on the frequency and state based receive beams. The UE 200 may be configured to determine a location at stage 1312 based on the DL-PRS measurements and assistance data (e.g., base station location information). The UE 200 may be configured to report the location results to the network (e.g., the gNB 110*a*, AMF 115, and/or LMF 120) via a Report Location message 1316 (e.g., LPP/NRPPa. RRC, etc.).

In an example, the UE 200 may be configured to provide AoA and other PRS beam measurement information to the server 400 in one or more provided measurement messages 1310, and the server 400 may be configured to determine a location of the UE at stage 1314.

Figure 13B:
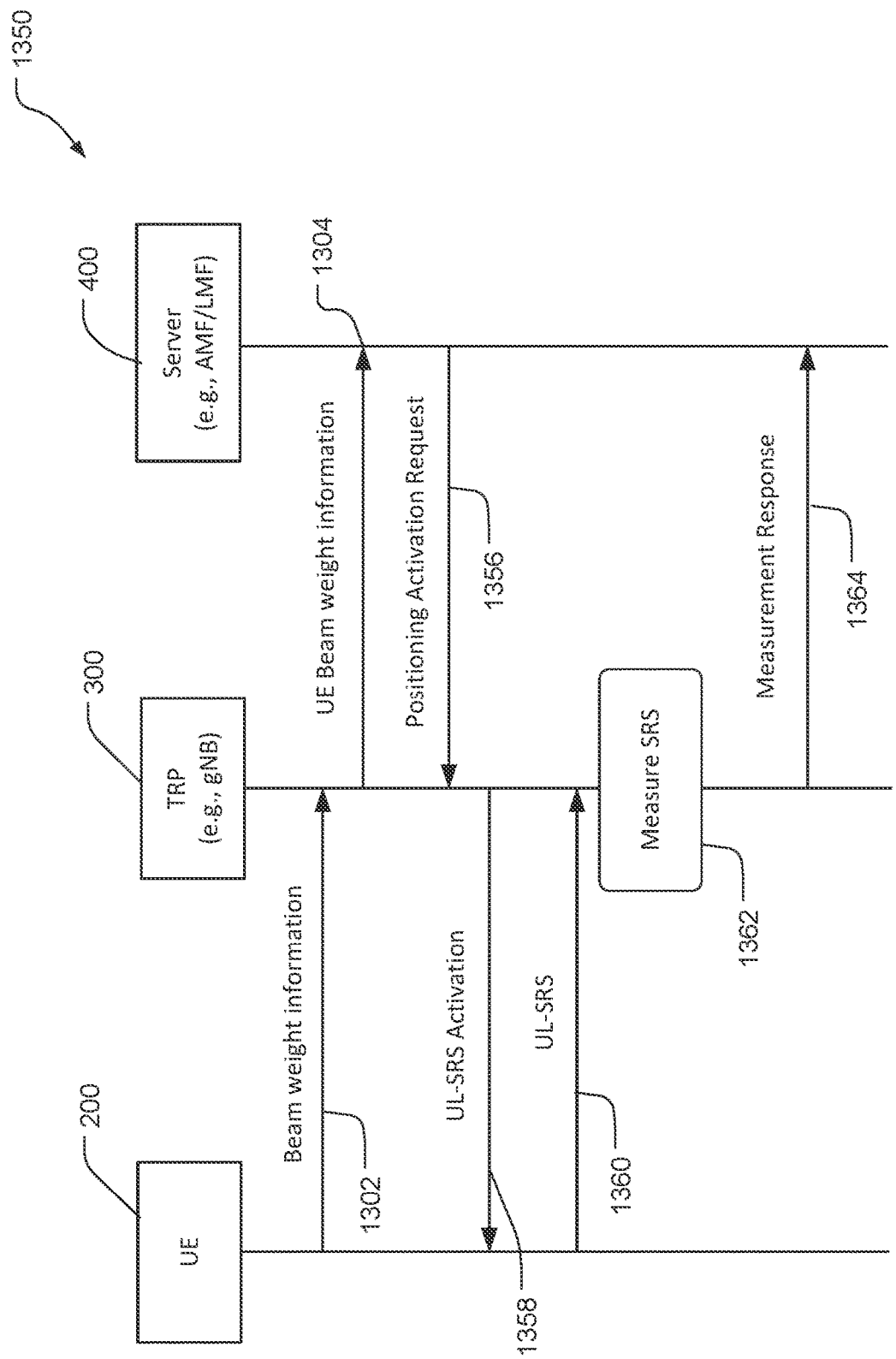
FIG. 13B is an example message flow for providing frequency and state dependent beam patterns for uplink based positioning.

Referring to FIG. 13B, an example message flow 1350 for providing frequency and state dependent beam patterns for uplink based positioning is shown. The message flow 1350 is an example only, and not a limitation, as other messages and signaling technologies may be used to propagate the frequency and state dependent beam patterns. The UE 200 may be configured to provide assistance data including the frequency and state based antenna array gain distributions such as in the data structure 1200 in one or more beam weight information messages 1302. The provided beam weight information messages 1302 may be provided via messaging utilizing wireless protocols such as LPP, NRPP, RRC messaging, or other signaling interfaces. In an example, the TRP 300 may be configured to provide the beam weight information in one or more UE beam weight information messages 1304. The server 400 may be configured to initiate a positioning session by sending a positioning activation request message 1356 to one or more TRPs 300. The TRP 300 may be configured to send a UL-SRS activation message 1358 configured to trigger or request the UE 200 to transmit one or more UL-SRS based on the frequency and state dependent beam patterns. In an example, the UL-SRS activation message 1358 may indicate frequencies/sub-bands (e.g., BWP, RBW, CC, RB, etc.) and approximate bearings of other proximate TRPs which the UE 200 should direct UL-SRS towards. In an embodiment, the UL-SRS activation message 1358 may be a Medium Access Control (MAC) Control Element (CE). The UE 200 is configured to transmit one or more UL-SRS 1360 in response to the UL-SRS activation 1358. The UL-SRS 1360 will utilize the frequency and state beam patterns based on the required sub-band information. The TRP 300, or other TRPs receiving the UL-SRS 1360, is/are configured to obtain measurements based on the SRS at stage 1362. The measurements may include AoA, RSSI, RTT, RSRP, RSRQ as required by the positioning activation request 1356. The TRP 300 may forward the measurements to the server 400 in one or more measurement response messages 1364. The server 400 may be configured to determine the position of the UE 200 based on UL-SRS measurements received from a plurality of TRPs.

Figure 14:
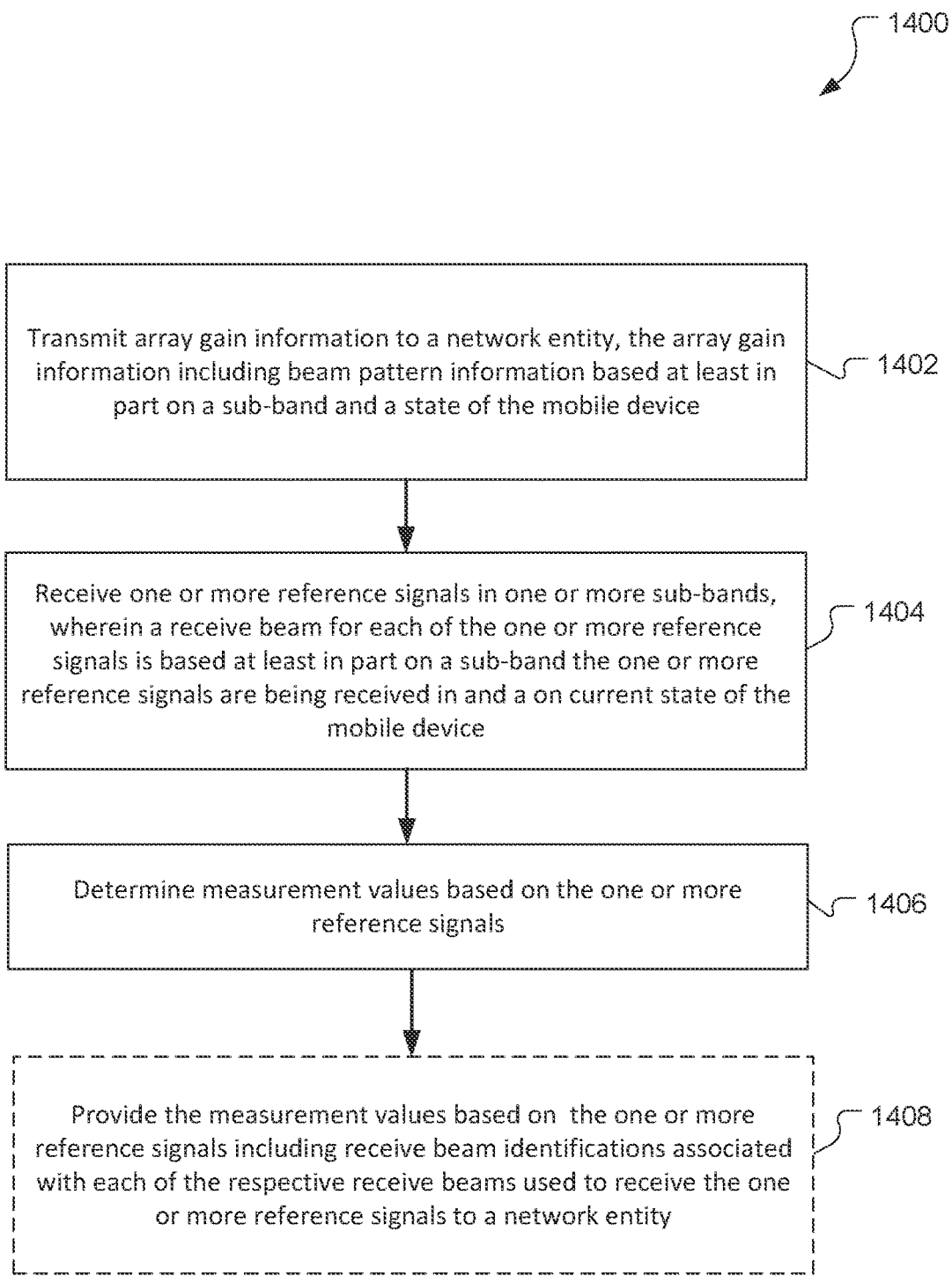
FIG. 14 is a process flow for an example method for measuring one or more reference signals based on frequency and state dependent beam patterns.

Referring to FIG. 14, with further reference to FIGS. 1-13B, a method 1400 for measuring one or more reference signals based on frequency and state dependent beam patterns includes the stages shown. The method 1400 is, however, an example only and is not limiting. The method 1400 may be altered, e.g., by having stages added, removed, rearranged, combined, performed concurrently, and/or having single stages split into multiple stages.

At stage 1402, the method includes transmitting array gain information to a network entity, the array gain information including beam pattern information based at least in part on a sub-band and a state of the mobile device. The UE 200 is a means for providing array gain information. The array gain information may include gain and direction information of at least one of a main lobe, side lobes, beam nulls, and grating lobes of each of the plurality of reference signals. In an example, the UE 200 may include array gain information such as the data structure 1200 which includes beam weight information for the UE based on the sub-band (i.e., the frequency) and the state of the UE. The data structure 1200 may be based on a bit map, text fields, or other computer readable data formats. The sub-band may be based on a PRS resource set in a frequency layer 700. In an example, the sub-band may be a BWP, a RBW, CC, RBs or other portions of the frequency spectrum within the operational capabilities of the UE 200. The state of the UE may be based on the predetermined states included in the data structure 1200. For example, the state may be based on the detection of peripheral devices (e.g., headphones, power cord, etc.) and/or the proximity of the user (e.g., signal attenuation based on the location of hands, head, or other radiation mitigation processes). Each of the beams in each of the beam patterns may be associated with a beam identification value to associate the beam with an orientation relative to the UE 200.

At stage 1404, the method includes receiving one or more reference signals in one or more sub-bands, wherein a receive beam for each of the one or more reference signals is based at least in part on a sub-band the one or more reference signals are being received in, and on a current state of the mobile device. The UE 200 is a means for receiving the one or more reference signals. In an example, the TRP 300 and neighboring TRPs are configured to transmit DL-PRS within one or more sub-bands. The UE 200 may utilize the beam weights based on the sub-band frequencies and the UE state. For example, referring to FIG. 12, the sub-band may be associated with a first frequency (i.e., Frequency X) and the UE may be in a second state (i.e., UE State 2), the UE 200 may utilize the corresponding beam weights X.2 to receive the DL-PRS.

At stage 1406, the method includes determining measurement values based on the one or more reference signals. The UE 200 is a means for obtaining the measurement values based on the reference signals. The UE 200 may determine the AoA for the DL-PRS as well as perform other measurements such as RSSI, RTT, RSRP, RSRQ, etc. based on the frequency and state based beam patterns. In an embodiment, the UE 200 may be configured to determine a location based on the DL-PRS measurements (i.e., local position determination).

At stage 1408, the method optionally includes providing, with the mobile device, the measurement values based on the one or more reference signals including receive beam identifications associated with each of the respective receive beams used to receive the one or more reference signals to a network entity. The UE 200 is a means for providing the measurement values. In an example, the UE 200 may be configured to provide one or more provide measurement messages 1310 utilizing LPP/NPP, RRC or other messaging. The measurement messages 1310 may include the AoA and/or other measurements, and the server 400 may be configured to determine a location of the UE 200 based on the measurement information.

Figure 15:
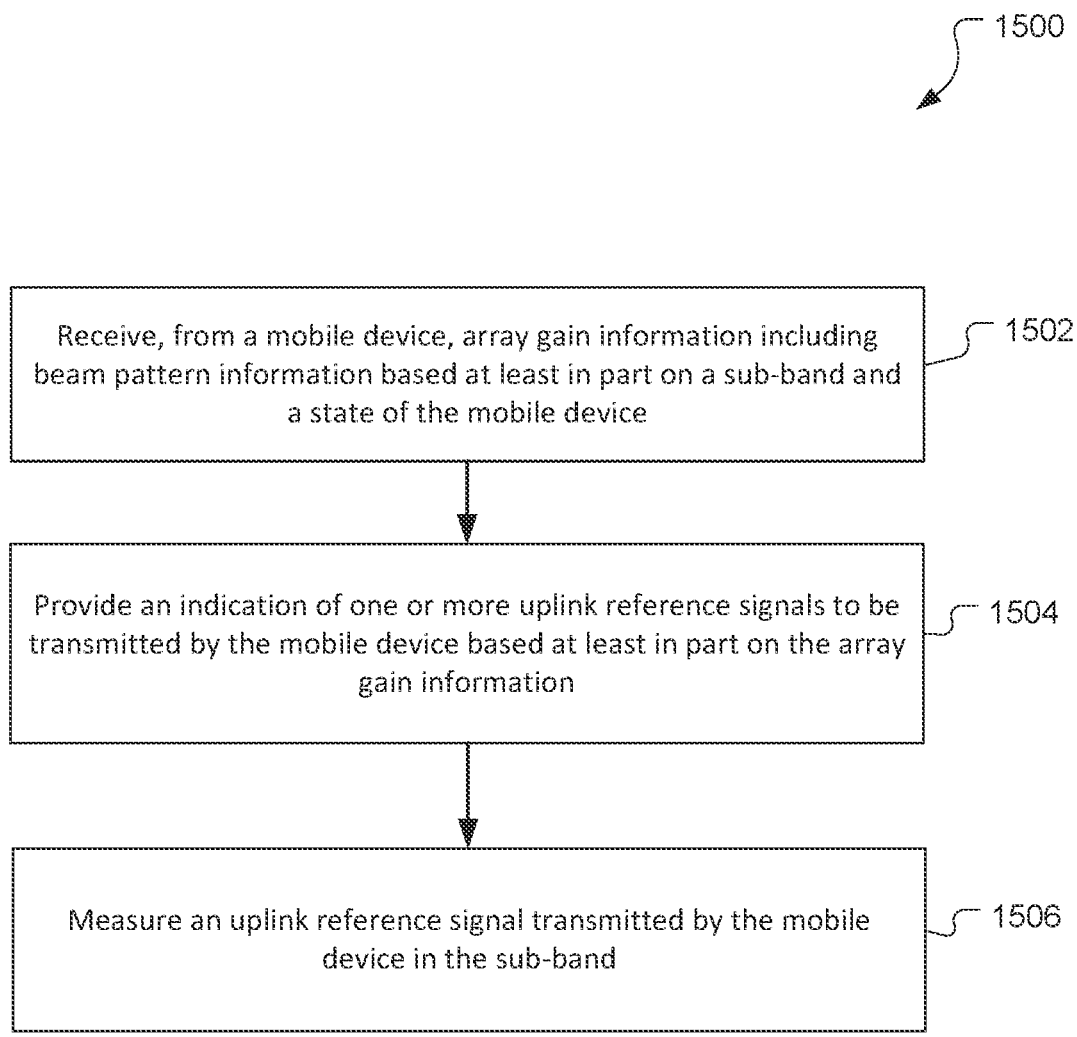
FIG. 15 is a process flow for providing uplink reference signals based on frequency and state dependent beam patterns.

Referring to FIG. 15, with further reference to FIGS. 1-13A, a method 1500 for providing uplink reference signals based on frequency and state dependent beam patterns includes the stages shown. The method 1500 is, however, an example only and is not limiting. The method 1500 may be altered, e.g., by having stages added, removed, rearranged, combined, performed concurrently, and/or having single stages split into multiple stages.

At stage 1502, the method includes receiving, from a mobile device, array gain information including beam pattern information based at least in part on a sub-band and a state of the mobile device. The TRP 300 is a means for receiving the array gain information. The array gain information may include gain and direction information of at least one of a main lobe, side lobes, beam nulls, and grating lobes of each of the plurality of reference signals. The UE 200 may be configured to provide the array gain information as the data structure 1200 including beam weights (e.g., beam patterns) based on one or more UE states and one or more frequency bands (e.g., BWP, RBW, CC, RBs, etc.). In an example, the UE 200 may provide the array gain information via one or more beam weight information messages 1302 which may be provided via messaging utilizing wireless protocols such as LPP, NRPP, RRC messaging, or other signaling interfaces.

At stage 1504, the method includes providing an indication of one or more uplink reference signals to be transmitted by the mobile device based at least in part on the array gain information. The TRP 300 is a means for providing the indication of one or more uplink reference signals. The TRP 300 may provide the array gain information associated with the UE 200 received at stage 1502 to a network entity such as the LMF 120. For example, the TRP 300 may utilize the NRPPa protocol (or other protocols) to provide the data structure 1200 to the LMF 120. In an example, the TRP 300 may receive a positioning activation request 1356 to obtain UL-SRS from one or more UEs. The TRP 300 may be configured to provide UL-SRS activation request messages 1358 to the UE 200 as an indication of the one or more uplink reference signals to be transmitted. In an example, the UL-SRS activation request messages 1358 may be a MAC-CE message configured to cause the UE 200 to transmit UL-SRS 1360. The UL-SRS activation request message 1358 may include an indication of the sub-band in which of the beams the UE 200 is to transmit. For example, the array gain information may indicate which sub-bands the UE 200 may transmit in based on the current UE state.

At stage 1506, the method includes measuring an uplink reference signal transmitted by the mobile device in the sub-band. The TRP 300 is a means for measuring the uplink reference signal. The UE 200 is configured to transmit SRS based on the beam patterns in the data structure 1200. The TRP may determine an AoA of the SRS and other measurements such as RSSI, RTT, RSRP, RSRQ, etc. for the received UL-PRS. In an example, the UL-SRS may include beam identification information based on the beam pattern and the TRP may determine the relative AoD based on the beam identification information and the beam patterns. In an embodiment, the TRP 300 may provide the SRS measurements to a network entity such as the LMF 120 via one or more measurement response messages 1364.

Figure 16:
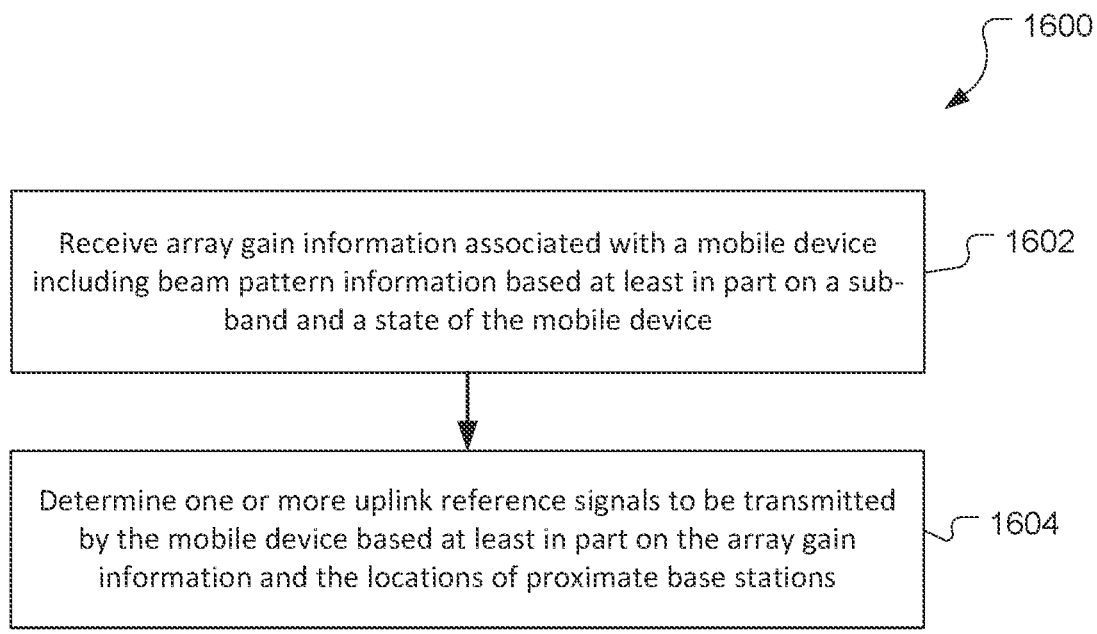
FIG. 16 is a process flow for an example method for determining uplink reference signals based at least in part on frequency and state dependent beam patterns.

Referring to FIG. 16, with further reference to FIGS. 1-13B, a method 1600 for determining uplink reference signals based at least in part on frequency and state dependent beam patterns includes the stages shown. The method 1600 is, however, an example only and not limiting. The method 1600 may be altered, e.g., by having stages added, removed, rearranged, combined, performed concurrently, and/or having single stages split into multiple stages.

At stage 1602, the method includes receiving array gain information associated with a mobile device including beam pattern information based at least in part on a sub-band and a state of the mobile device. The LMF 120 is a means for receiving array gain information. The array gain information may include gain and direction information of at least one of a main lobe, side lobes, beam nulls, and grating lobes of each of the plurality of reference signals. In an example, the UE 200 may be configured to provide the array gain information as the data structure 1200, or other data structures, to the LMF 120. The array gain information includes beam pattern information, including relative beam angles, for a UE based on a sub-band and UE state. The UE 200 may provide the array gain information to a serving TRP 300 and the TRP 300 may provide the array gain information to the LMF 120. For example, the UE 200 may utilize LPP/NPP, RRC, or other messaging protocols to provide the frequency and state based beam pattern information.

At stage 1604, the method includes determining one or more uplink reference signals to be transmitted by the mobile device based at least in part on the array gain information and the locations of proximate base stations. The LMF 120 is a means for determining one or more uplink reference signals. In an example, a serving cell, such as the TRP 300, for the UE 200 may be communicating with UE 200 on a UE generated transmit and receive beam (i.e., one of the beams in the data structure 1200 based on the frequency and UE state). This serving beam may be used by the LMF 120 to determine other relative beams the UE 200 may use to communicate with other proximate base stations. The LMF 120 is configured to select beams for SRS based on the relative bearings of the other stations to the UE 200, and the frequency and UE state based beam patterns for the UE 200. The LMF 120 may provide a positioning activation request 1356 to the serving cell indicating the beams the UE 200 will utilize to transmit UL-SRS. The serving cell provides an UL-SRS activation message 1358 to the UE 200 indicating the SRS beams to transmit.

The techniques provided herein are not limited to positioning reference signals. Other reference signals such as tracking reference signals (TRS), channel state information reference signals (CSI-RS), primary synchronization signals (PSS), secondary synchronization signals (SSS), sounding reference signals (SRS), etc. may be associated with one or more sub-bands and a TRP 300, server 400 and/or UE 200 may be configured to apply the frequency and UE state dependent beam patterns described herein.

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

As used herein, the singular forms "a," "an," and "the" include the plural forms as well, unless the context clearly indicates otherwise. For example, "a processor" may include one processor or multiple processors. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Also, as used herein, "or" as used in a list of items prefaced by "at least one of" or prefaced by "one or more of" indicates a disjunctive list such that, for example, a list of "at least one of A, B, or C," or a list of "one or more of A, B, or C" means A or B or C or AB or AC or BC or ABC (i.e., A and B and C), or combinations with more than one feature (e.g., AA, AAB, ABBC, etc.).

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or evenly primarily, for communication, or that the device be a mobile device, but indicates that the device includes wireless communication capability (one-way or two-way), e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements without departing from the scope of the disclosure.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

The invention claimed is:

1. A method for determining a location of a mobile device, comprising:
   transmitting array gain information to a network entity, the array gain information including beam pattern information based at least in part on a sub-band and a state of the mobile device;
   receiving one or more reference signals in one or more sub-bands, wherein a receive beam for each of the one or more reference signals is based at least in part on the sub-band the one or more reference signals are being received in, and on a current state of the mobile device;
   determining measurement values based on the one or more reference signals; and
   determining the location of the mobile device based at least in part on the measurement values, wherein the state of the mobile device is based at least in part on proximity of a user to the mobile device, or a peripheral device that is operably coupled to the mobile device, or a combination thereof.

2. The method of claim 1 wherein determining the location of the mobile device includes providing, with the mobile device, the measurement values based on the one or more reference signals including receive beam identifications associated with each of the respective receive beams used to receive the one or more reference signals to the network entity.

3. The method of claim 1, wherein the peripheral device is at least one of a headphone, a power cord, a card reader, or a mobile device cover.

4. The method of claim 1 wherein the sub-band is based on an active bandwidth part utilized by the mobile device.

5. The method of claim 1 wherein the sub-band is based on a resource bandwidth.

6. The method of claim 1 wherein the array gain information includes beam pattern information based on a plurality of antenna elements from a plurality of antenna modules.

7. The method of claim 1 wherein the beam pattern information includes gain and direction information of at least one of a main lobe, side lobes, beam nulls, and grating lobes.

8. The method of claim 1 wherein the measurement values includes one or more of an Angle of Arrival (AoA), a Received Signal Strength Indicator (RSSI), Round Trip signal propagation Time (RTT), Reference Signal Time Difference (RSTD), Reference Signal Received Power (RSRP), and Reference Signal Received Quality (RSRQ).

9. An apparatus, comprising:
   a memory;
   at least one transceiver;
   at least one processor communicatively coupled to the memory and the at least one transceiver, and configured to:
      transmit, with the at least one transceiver, array gain information to a network entity, the array gain information including beam pattern information based at least in part on a sub-band and a state of the apparatus, wherein the state of the apparatus is based at least in part on a proximity of a user to the apparatus, or a peripheral device that is operably coupled to the apparatus, or a combination thereof;
      receive, with the at least one transceiver, one or more reference signals in one or more sub-bands, wherein a receive beam for each of the one or more reference signals is based at least in part on the sub-band the one or more reference signals are being received in, and on a current state of the apparatus;
      determine measurement values based on the one or more reference signals; and
      determine a location based at least in part on the measurement values.

10. The apparatus of claim 9 wherein the at least one processor is further configured to provide the measurement values based on the one or more reference signals including receive beam identifications associated with each of the respective receive beams used to receive the one or more reference signals to the network entity.

11. The apparatus of claim 9, wherein the peripheral device is at least one of a headphone, a power cord, a card reader, or a mobile device cover.

12. The apparatus of claim 9 wherein the sub-band is based on an active bandwidth part utilized by the apparatus.

13. The apparatus of claim 9 wherein the sub-band is based on a resource bandwidth.

14. The apparatus of claim 9 wherein the array gain information includes beam pattern information based on a plurality of antenna elements from a plurality of antenna modules.

15. The apparatus of claim 9 wherein the beam pattern information includes gain and direction information of at least one of a main lobe, side lobes, beam nulls, and grating lobes.

16. The apparatus of claim 9 wherein the measurement values may include one or more of an Angle of Arrival (AoA), a Received Signal Strength Indicator (RSSI), Round Trip signal propagation Time (RTT), Reference Signal Time Difference (RSTD), Reference Signal Received Power (RSRP), and Reference Signal Received Quality (RSRQ).

17. An apparatus for determining a location of a mobile device, comprising:
   means for transmitting array gain information to a network entity, the array gain information including beam pattern information based at least in part on a sub-band and a state of the mobile device;
   means for receiving one or more reference signals in one or more sub-bands, wherein a receive beam for each of the one or more reference signals is based at least in part on the sub-band the one or more reference signals are being received in, and on a current state of the mobile device;
   means for determining measurement values based on the one or more reference signals; and
   means for determining the location of the mobile device based at least in part on the measurement values, wherein the state of the mobile device is based at least in part on proximity of a user to the mobile device, or a peripheral device that is operably coupled to the mobile device, or a combination thereof.

18. A non-transitory processor-readable storage medium comprising processor-readable instructions configured to cause one or more processors to determine a location of a mobile device, comprising:
   code for transmitting array gain information to a network entity, the array gain information including beam pattern information based at least in part on a sub-band and a state of the mobile device;
   code for receiving one or more reference signals in one or more sub-bands, wherein a receive beam for each of the one or more reference signals is based at least in part on the sub-band the one or more reference signals are being received in, and on a current state of the mobile device;

code for determining measurement values based on the one or more reference signals; and code for determining the location of the mobile device based at least in part on the measurement values, wherein the state of the mobile device is based at least in part on proximity of a user to the mobile device, or a peripheral device that is operably coupled to the mobile device, or a combination thereof.

19. A method for determining a location of a mobile device, comprising:

transmitting array gain information to a network entity, the array gain information including beam pattern information based at least in part on a sub-band and a state of the mobile device, wherein the array gain information is based at least in part on the proximity of a user to the mobile device, or a peripheral device that is operably coupled to the mobile device, or a combination thereof;

receiving one or more reference signals in one or more sub-bands, wherein a receive beam for each of the one or more reference signals is based at least in part on the sub-band the one or more reference signals are being received in, and on a current state of the mobile device;

determining measurement values based on the one or more reference signals; and determining the location of the mobile device based at least in part on the measurement values.

* * * * *